United States Patent
Geyer et al.

(10) Patent No.: US 11,398,791 B2
(45) Date of Patent: Jul. 26, 2022

(54) MODEL PREDICTIVE CONTROL OF A CONVERTER BASED ON PULSE WIDTH MODULATED SWITCHING PATTERNS

(71) Applicant: ABB Schweiz AG, Baden (CH)

(72) Inventors: Tobias Geyer, Ennetbaden (CH); Vedrana Spudic, Zürich (CH); Christof Gutscher, Zürich (CH); Andrea Rueetschi, Baden (CH)

(73) Assignee: ABB SCHWEIZ AG, Baden (CH)

( * ) Notice: Subject to any disclaimer, the term of this patent is extended or adjusted under 35 U.S.C. 154(b) by 67 days.

(21) Appl. No.: 16/927,143

(22) Filed: Jul. 13, 2020

(65) Prior Publication Data

US 2020/0350847 A1 Nov. 5, 2020

Related U.S. Application Data

(63) Continuation of application No. PCT/EP2019/050345, filed on Jan. 8, 2019.

(30) Foreign Application Priority Data

Jan. 11, 2018 (EP) .................................. 18151248

(51) Int. Cl.
*H02P 27/12* (2006.01)
*H02M 7/487* (2007.01)

(52) U.S. Cl.
CPC ............ *H02P 27/12* (2013.01); *H02M 7/487* (2013.01)

(58) Field of Classification Search
CPC ................................ H02P 27/12; H02M 7/487
See application file for complete search history.

(56) References Cited

U.S. PATENT DOCUMENTS

| | | | | |
|---|---|---|---|---|
| 5,194,797 A | * | 3/1993 | Kahkipuro | H02P 21/12 318/727 |
| 7,015,664 B2 | * | 3/2006 | Coles | H02P 6/185 318/400.01 |

(Continued)

FOREIGN PATENT DOCUMENTS

| | | |
|---|---|---|
| EP | 2469692 A1 | 6/2012 |
| EP | 2891241 B1 | 9/2016 |

(Continued)

OTHER PUBLICATIONS

Buja, G., "Optimum Output Waveforms in PWM Inverters," IEEE Transactions on Industry Applications, vol. IA-16, Nov./Dec. 1980, pp. 830-836.

(Continued)

*Primary Examiner* — Rina I Duda
(74) *Attorney, Agent, or Firm* — Greenberg Traurig LLP

(57) ABSTRACT

A method for controlling a three-phase electrical converter includes selecting a three-phase optimized pulse pattern from a table of pre-computed optimized pulse patterns based on a reference flux. The method includes determining a two-component optimal flux from the optimized pulse pattern and a one-component optimal third variable. The method includes determining a two-component flux error from a difference of the optimal flux and an estimated flux estimated based on measurements in the electrical converter. A one-component third variable error is determined from a difference of the optimal third variable and an estimated third variable. The optimized pulse pattern is modified by time-shifting switching instants of the optimized pulse pattern such that a cost function depending on the time-shifts is minimized. The method includes applying the modified optimized pulse pattern to the electrical converter.

20 Claims, 11 Drawing Sheets

(56) References Cited

U.S. PATENT DOCUMENTS

| | | | | |
|---|---|---|---|---|
| 7,898,210 | B2* | 3/2011 | Hsieh | H02P 27/08 |
| | | | | 318/811 |
| 8,129,936 | B2* | 3/2012 | Becker | H02P 23/30 |
| | | | | 318/802 |
| 9,325,252 | B2* | 4/2016 | Narimani | H02M 5/4585 |
| 2013/0009611 | A1* | 1/2013 | Tripathi | H02P 21/12 |
| | | | | 322/23 |
| 2014/0361724 | A1* | 12/2014 | Rogers | H02P 27/08 |
| | | | | 318/807 |
| 2016/0254771 | A1 | 9/2016 | Qiao et al. | |
| 2016/0276919 | A1* | 9/2016 | Geyer | H03K 5/08 |
| 2017/0133845 | A1* | 5/2017 | Geyer | H02J 3/1821 |

FOREIGN PATENT DOCUMENTS

| | | |
|---|---|---|
| WO | 2015078656 A1 | 6/2015 |
| WO | 2017005906 A1 | 1/2017 |
| WO | 2017013125 A1 | 1/2017 |

OTHER PUBLICATIONS

Geyer et al., "Model Predictive Pulse Pattern Control," IEEE Transactions on Industry Applications, vol. 48, No. 2, Mar./Apr. 2012, pp. 663-676.

Newton et al., "Neutral Point Control for Multi-Level Inverters: theory, design and operational limitations," IEEE Industry Applications Society, Annual Meeting, New Orleans, Louisiana, Oct. 5-9, 1997, pp. 1336-1343.

Pou et al., "Evaluation of the Low-Frequency Neutral-Point Voltage Oscillations in the Three-Level Inverter," IEEE Transactions on Industrial Electronics, vol. 52, No. 6, Dec. 2005, pp. 1582-1588.

Richter et al., "High-Speed Online MPC Based on a Fast Gradient Method Applied to Power Converter Control," 2010 American Control Conference, Marriott Waterfront, Baltimore, Maryland, Jun. 30-Jul. 2, 2010, pp. 4737-4743.

Steinke, J., "Switching Frequency Optimal PWM Control of a Three-Level Inverter," IEEE Transactions on Power Electronics, vol. 7, No. 3, Jul. 1992, pp. 487-496.

Stolze et al., "Effective variable switching pint predictive current control for ac low-voltage drives," International Journal of Control, 2014, 13 pp.

European Patent Office, International Search Report & Written Opinion issued in corresponding Application No. PCT/EP2019/050345, dated Apr. 12, 2019, 14 pp.

Burtscher et al., "Deadlock Avoidance in Model Predictive Direct Torque Control," IEEE Transactions on Industry Applications, vol. 49, No. 5, Sep./Oct. 2013, pp. 2126-2135.

Kieferndorf et al., "Model Predictive Control of the Internal Voltages of a Five-Level Active Neutral Point Clamped Converter," Energy Conversion Congress and Exposition (ECCE), IEEE, Sep. 15, 2012, pp. 1676-1683.

Oikonomou et al., "Model Predictive Pulse Pattern Control for the Five-Level Active Neutral-Point-Clamped Inverter," IEEE Transactions on Industry Applications, vol. 49, No. 6, Nov./Dec. 2013, pp. 2583-2592.

Scoltock et al., "A Comparison of Model Predictive Control Schemes for MV Induction Motor Drives," IEEE Transactions on Industrial Informatics, vol. 9, No. 2, May 2013, pp. 909-919.

Spudic et al., "Fast Control of a Modular Multilevel Converter STATCOM using Optimized Pulse Patterns," 2017 IEEE Energy Conversion Congress and Exposition (ECCE), Oct. 2, 2017, pp. 2707-2714.

* cited by examiner

US 11,398,791 B2

MODEL PREDICTIVE CONTROL OF A CONVERTER BASED ON PULSE WIDTH MODULATED SWITCHING PATTERNS

FIELD OF THE INVENTION

The invention relates to a method, a computer program, a computer-readable medium and a controller for controlling an electrical converter. Furthermore, the invention relates to an electrical converter.

BACKGROUND OF THE INVENTION

For electrical converters model predictive control is used for determining switching states of the converter circuit via determining future states of the electrical converter based on a model of the converter and connected components, such as electrical motors, electrical generators, electrical grids, etc.

In WO 2015 078 656 A1 pre-computed optimized pulse patterns are further optimized with model predictive control by manipulating their switching instants. In such a way, the harmonic content of the produced currents may be reduced.

The harmonic benefit of optimized pulse patterns over other modulation methods is particularly high at low pulse numbers (i.e. the ratio between the switching frequency and the fundamental frequency). At very high pulse numbers and low fundamental frequencies, however, optimized pulse patterns may be difficult to calculate and may use much controller memory. Optimized pulse pattern-based control methods typically solve this issue by switching to other control methods.

In EP 2 469 692 A1 an electrical system is controlled in such a way that switching sequences with switching time instants for the converter that have been determined with respect to a certain first optimization goal are modified in a second step. A resultant flux error is determined. The switching time instants are modified to reduce the flux error.

In the article of JAMES SCOLTOCK ET AL: "A Comparison of Model Predictive Control Schemes for MV Induction Motor Drives", IEEE TRANSACTIONS ON INDUSTRIAL INFORMATICS, IEEE SERVICE CENTER, NEW YORK, N.Y., US, vol. 9, no. 2, 10 Oct. 2012 (2012 Oct. 10), pages 909-919, several model predictive controls schemes are compared with pulse width modulation and optimized pulse patterns. It is mentioned that a common mode component can be added to the reference voltage.

In the article of NIKOLAOS OIKONOMOU ET AL: "Model Predictive Pulse Pattern Control for the Five-Level Active Neutral-Point-Clamped Inverter", IEEE TRANSACTIONS ON INDUSTRY APPLICATIONS, vol. 49, no. 6, 15 May 2013 (2013 May 15), pages 2583-2592, it is described how optimized pulse patterns can be selected dependent on a fundamental frequency and that reference flux values can be stored together with the optimized pulse patterns.

DESCRIPTION OF THE INVENTION

It is an objective of the invention to provide an electrical converter adapted for producing an output current with low harmonic distortions at low fundamental frequencies. It is a further objective of the invention to provide a simple and computationally less demanding model predictive control scheme, which also may be used at high pulse numbers.

These objectives are achieved by the subject-matter of the independent claims. Further exemplary embodiments are evident from the dependent claims and the following description.

A first aspect of the invention relates to a method for controlling an electrical converter. The electrical converter is adapted for converting a DC voltage into a multi-phase voltage with at least two voltage levels. The electrical converter may comprise a converter circuit with semiconductor switches, which may be arranged in at least two (such as three) phase branches. The phase branches may be connected in parallel to a DC link and/or may be adapted for converting a DC link voltage or more generally a DC voltage into an AC phase voltages. Each phase branch may be adapted for generating at least two voltage levels.

For example, the phase branches may be adapted for generating three voltage levels, such as a positive DC link voltage, a negative DC link voltage and a neutral point voltage. The neutral point voltage may be provided by a split DC link. The electrical converter may be a neutral point clamped converter. However, in general the method also may be performed with other types of converters.

The electrical converter may be connected with its AC side to an electrical machine, such as a generator or motor and/or may supply this electrical machine with electrical power. The stator and/or rotor flux mentioned below may refer to magnetic fluxes in the stator and/or rotor of this electrical machine. It also may be the case that the electrical converter is connected to an electrical grid with its AC side. In this case, also virtual stator and/or virtual rotor fluxes may be defined for the electrical grid.

The electrical converter may be a power converter. Its semiconductor switches may be adapted for switching currents of more than 10 A and/or voltages of more than 1000 V.

The electrical converter may comprise a controller, which performs the method. For example, the method may be performed at each sampling time instant.

According to an embodiment of the invention, the method comprises: determining a modulating signal vector from a stator flux reference vector. The stator flux reference vector may be provided by an outer control loop, which based on measurements and on a reference speed and/or reference frequency determines the stator flux reference vector.

The modulating signal vector is a signal indicative of the output voltages to be generated by the converter. For example, the modulating signal vector may be a normalized voltage vector determined by differentiating the stator flux reference vector.

The invention is also applicable to grid-side converters, i.e. the stator flux vector may be a virtual stator flux vector. Also, a rotor flux vector may be a virtual rotor flux vector. For example, in the case of a converter supplying an electrical grid, the stator flux vector may be a virtual converter flux vector, and the rotor flux vector may be a grid flux vector, which may be defined at a point of common coupling (PCC).

It has to be noted that here and in the following, vectors may be quantities with two or three components.

According to an embodiment of the invention, the method further comprises: determining a switching pattern from the modulating signal vector via pulse width modulation, the switching pattern comprising a sequence of switching transitions, wherein a switching transition defines a switch position, at which a phase of the converter is switched from one voltage level to another voltage level, and a transition time instant at which the phase of the converter is switched.

The modulating signal vector may be indicative of the actual output voltages to be generated. Together with an actual frequency and/or actual speed, the movement of the modulating signal vector may be extrapolated into the future and therefrom, a sequence of future switching sequences may be determined. For example, the trajectories of the components of the extrapolated modulating signal vector may be compared with one or more carrier signals (which may be triangular signals with a carrier frequency). The switching transitions may be determined from the trajectories and the carrier signal(s) with pulse width modulation. For example, a crossing point of a trajectory with a carrier signal may determine a switching time instant and/or the direction of the crossing may determine, whether the voltage level is raised or lowered at the switching time instant.

It has to be noted that these calculations all may be performed online during a sampling time interval, i.e. the time between two sampling time instants, and/or may be performed numerically.

According to an embodiment of the invention, the method further comprises: determining a stator flux error by subtracting from the stator flux reference vector an estimated stator flux vector, which is estimated from measurements in the electrical converter. The estimated stator flux vector may be provided by an outer control loop. The difference of the stator flux reference vector and the estimated stator flux vector or the magnitude of the difference may be seen as error, which may be minimized by the following step of the method and/or with model predictive control.

According to an embodiment of the invention, the method further comprises: modifying the switching pattern by moving transition time instants of switching transitions of the switching pattern, such that the stator flux error is minimized. The transition time instants may be moved forward and backward in time, such that the switching pattern, which was generated by pulse width modulation, is modified. The transition time instants may be moved such that the modified switching pattern results in a stator flux, which is closer to the stator flux reference. In such a way, the modified switching pattern may result in lower amplitudes for the higher order harmonics than the unmodified switching pattern.

It may be the case that constraints are present on the movement of the switching time instants. For example, the order of the switching transitions in one phase or all the phases may not be changed.

Furthermore, it may be the case that additional switching time instants are included in the unmodified switching pattern, which, for example, would result in pulses of zero length. After optimization, these pulses may have a nonzero length and may contribute to the compensation of the stator flux error.

The optimization of the switching pattern may be performed online by solving a quadratic program, by minimizing an objective function subject to constraints, etc.

According to an embodiment of the invention, the method further comprises: applying at least a part of the modified switching pattern to the electrical converter. The switching transitions may be translated into switching times and switching states of the semiconductor switches of the electrical converter. Corresponding gate signals for the semiconductor switches may be generated.

It may be the case that the switching pattern and/or the modified switching pattern is longer than the sampling time interval. In this case, only a part of the switching pattern may be converted into switching times and switching states.

According to an embodiment of the invention, a stator flux correction is defined as the sum of products of a voltage level difference and a time difference, the voltage level difference of a switching transition being the difference of the voltage level before and after the switching transition, and the time difference being the difference between a moved and an unmodified transition time instant. This stator flux correction may be determined per phase or for all phases. The switching pattern may be optimized such that the stator flux correction at least partially compensates the stator flux error. The stator flux correction may be optimized by moving the transition time instants, such that the stator flux correction is equal to the stator flux error.

According to an embodiment of the invention, the switching pattern is regularly determined at each sampling time instant over a prediction horizon. The prediction horizon may be longer than a difference between consecutive sampling time instants. For example, only a part of the modified switching pattern shorter than the prediction horizon, such as a difference between consecutive sampling time instants may be applied to the electrical converter. In other words, the method may predict a future behavior of the electrical converter and/or the supplied electrical machine for a prediction horizon that may be longer than a sampling time interval. At each sampling time instant, the future behavior for more than the sampling time interval may be determined.

According to an embodiment of the invention, the switching transitions of the switching pattern are determined over a prediction horizon by: determining future samples of the modulating signal vector over the prediction horizon by rotating the modulating signal vector in the $\alpha\beta 0$-coordinate system with an actual angular frequency to a time instant of the respective future sample; and generating a switching transition when a carrier signals crosses a value of the future sample during a time interval of the future sample. The future samples may determine a trajectory and/or function of the modulating signal over time. The future samples may be determined by extrapolating the components of the modulating signal vector into the future. This may be done by translating the modulating signal vector into the $\alpha\beta 0$-coordinate system, for example with a Clarke transformation. After that the modulating signal vector may be rotated with the actual angular frequency, which may be determined from the actual speed and/or actual frequency, to the time instant of the future sample. This rotation may be a rotation of the $\alpha\beta$-components by the actual angular frequency times the time instant of the future sample. Thus, it may be assumed that the modulating signal vector is rotating with constant angular frequency. After that rotation, the rotated modulating signal vector may be transformed back into the system, in which it was provided, for example an abc-system. This back transformation may be performed with an inverse Clarke transformation.

The carrier signal may be represented as a triangular signal, and intersections of the trajectories of the extrapolated components of the modulating signal vector may be determined with the carrier signal. For example, the trajectories may be step (or piecewise constant) trajectories over time, whose values are determined from the values of the future samples at the time instants of the future samples. Each crossing may determine a switching time instant for a switching transition. Depending on the direction of the crossing, it may be determined, whether the voltage level increases or decreases at the intersection.

According to an embodiment of the invention, the stator flux reference vector is a three-component vector in the $\alpha\beta 0$-coordinate system. A 0-component of the stator flux reference vector may be used for controlling a neutral point potential. Also, the stator flux error may be a three-component vector in the $\alpha\beta 0$-coordinate system.

According to an embodiment of the invention, a common-mode component is added to the modulating signal vector.

A common-mode component may be the sum of the phase components of the modulating signal vector. With this common-mode component, the output voltages of the electrical converter may be influenced without changing the output current, assuming that a star point of a load floats. This may be beneficial for influencing further optimization goals of the electrical converter and/or for complying with physical restrictions of the electrical converter.

According to an embodiment of the invention, when a modulation index determined from a magnitude of the stator flux reference vector is smaller than a threshold, the common-mode component is at least the modulation index plus a minimal pulse width divided by a carrier interval length of a carrier signal, such that pulse lengths of pulses generated by pulse width modulation with the carrier signal are longer than a minimal pulse width.

The modulation index may indicate the ratio of the magnitude of the actual output voltage with respect to a possible maximal output voltage, such as (half the DC voltage provided by a DC link. When the modulation index is rather small, it may be necessary to make sure that pulse lengths, i.e. intervals of the switching pattern with nonzero output voltage levels, are longer than a minimal pulse length. This minimal pulse length may correspond to a minimal time for which the semiconductor switches must remain in the on state before they may be turned off.

According to an embodiment of the invention, the common-mode component is controlled with a hysteresis controller, which sets the common-mode component to a first value, when a neutral point potential is larger than a maximal value and which sets the common-mode component to a second value, when the common-mode component is smaller than a minimal value. The second value may be of opposite sign with respect to the first value, for example, the negative first value. The first value may be in a direction of the power flow, which may be positive in motoring operation and negative in generating mode.

For example, in the case when the modulation index is higher than the threshold, the common-mode component may be used for controlling the neutral point potential of a split DC link. Since a common-mode component may increase and/or decrease the neutral point potential, the neutral point potential may be controlled to stay within bounds by inverting the neutral point potential each time the bound is exceeded.

According to an embodiment of the invention, the flux reference vector is determined from a reference angle and a reference magnitude. The reference angle and the reference magnitude may be provided by an outer control loop, which determines them from a reference speed and/or reference frequency and optional measurements of currents and/or voltages in an electrical machine supplied by the electrical converter.

According to an embodiment of the invention, a pulse number for the switching pattern is determined from a fundamental frequency and a maximum allowed switching frequency. The pulse number may be the ratio of the maximum allowed switching frequency and the fundamental frequency rounded to the closest lower integer. The fundamental frequency may be based on the reference speed and/or the reference frequency for the electrical converter. The pulse number may determine the number of pulses for the optimized pulse pattern, which may be used, when the pulse number is smaller or equal to a threshold.

According to an embodiment of the invention, when the pulse number exceeds a threshold, the switching pattern is determined with (for example carrier-based) pulse width modulation and otherwise, the switching pattern is determined from a table of optimized pulse patterns.

In general, for low pulse numbers (i.e. lower or equal to the threshold), optimized pulse patterns may be used as switching patterns, while for higher pulse numbers, (for example carrier-based) pulse width modulated switching patterns may be used, as described above and below. Thus, the same outer control loops and/or the same switching pattern optimizer may be used in both cases.

The optimized pulse patterns may have been optimized offline and may have the advantage that they may result in a lower total harmonic distortion than the (for example carrier-based) pulse width modulated switching patterns. However, for high pulse numbers, it may be difficult to store large optimized pulse patterns and/or to determine them offline.

The pulse width modulated switching pattern may be used to extend an optimized pulse pattern based control method to high pulse numbers. The pulse width modulated switching patterns may be generated online and may be fed to the same switching pattern optimizer as the optimized pulse pattern. In a variable speed drive, for example, this extension may make the switching pattern optimization, which moves switching time instants, applicable to all operating points, ranging from standstill operation to field weakening at high speeds.

According to an embodiment of the invention, the optimized pulse patterns are indexed in the table by a pulse number and a modulation index. Contrary to the pulse width modulated switching patterns, the optimized pulse patters are determined from these two quantities and not from the stator flux reference and/or modulating signal vector. The pulse number and the modulation index may be provided by an outer control loop.

According to an embodiment of the invention, in the case, when an optimized pulse pattern is used as switching pattern, the stator flux reference vector is determined from the optimized pulse pattern. The stator flux reference may be determined by integrating a voltage waveform of the optimized switching pattern. For performing the integration, a flux reference angle and a reference magnitude, which may be provided by an outer control loop, may be needed.

A further aspect of the invention relates to a computer program, which when being executed on a processor is adapted for executing the steps of the method as described in the above and in the following. For example, the controller of the electrical converter may provide such a processor and the method is performed by software running in the controller. However, it may also be possible that the method is at least partially implemented in software. For example, at least parts of the methods may be performed by an FPGA and/or DSP.

A further aspect of the invention relates to a computer-readable medium on which such a computer program is stored. A computer-readable medium may be a floppy disk, a hard disk, an USB (Universal Serial Bus) storage device, a RAM (Random Access Memory), a ROM (Read Only Memory), an EPROM (Erasable Programmable Read Only Memory) or a FLASH memory. A computer readable medium may also be a data communication network, e.g. the Internet, which allows downloading a program code. In general, the computer-readable medium may be a non-transitory or transitory medium.

A further aspect of the invention relates to a controller for controlling an electrical converter, which controller is adapted for executing the steps of the method as described in the above and in the following. As already mentioned, such a controller may comprise a processor running software, which performs the method. Furthermore, the controller may comprise an FPGA and/or DSP at least partially implementing the method.

A further aspect of the invention relates to an electrical converter, which comprises a converter circuit adapted for converting a DC voltage into a multi-phase voltage with at least two voltage levels and such a controller adapted for controlling semiconductor switches of the converter circuit.

It has to be understood that features of the method as described in the above and in the following may be features of the computer program, the computer-readable medium and the electrical converter as described in the above and in the following, and vice versa.

These and other aspects of the invention will be apparent from and elucidated with reference to the embodiments described hereinafter.

BRIEF DESCRIPTION OF THE DRAWINGS

The subject matter of the invention will be explained in more detail in the following text with reference to exemplary embodiments, which are illustrated in the attached drawings.

In principle, identical parts are provided with the same reference symbols in the figures.

Detailed Description of Exemplary Embodiments

Three-Level Converter System

Figure 1:
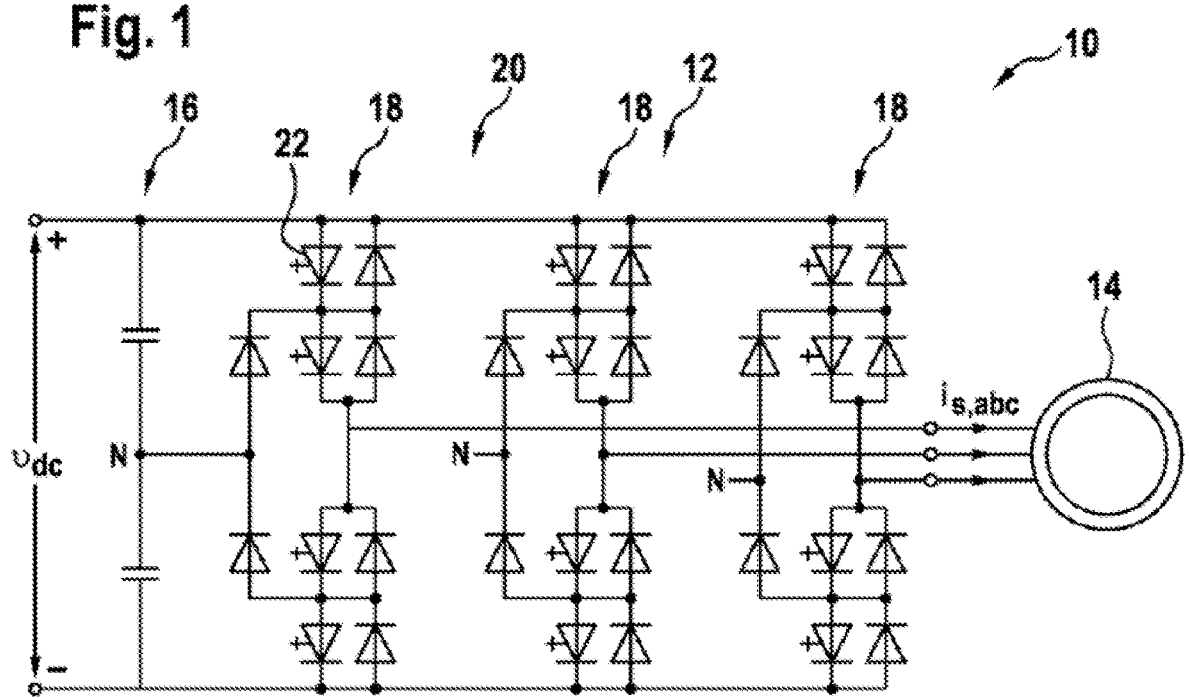
FIG. 1 schematically shows a converter system with an electrical converter according to an embodiment of the invention.

FIG. 1 shows a converter system 10 comprising an electrical converter 12, which is supplied with a DC voltage $v_{dc}$ and which generates a three-phase output or stator voltage, which is supplied to an electrical machine 14. It may be that the electrical machine 14 is a generator or a motor, and that the stator current $i_{s,abc}$ flows to or from the electrical machine 14. It also may be that the electrical converter is connected to an electrical grid instead of the electrical machine 14.

As shown, the electrical converter 12 is a three-phase three-level neutral point clamped voltage source converter. However, also other topologies are possible with the control method described above and below.

The electrical converter comprises a split DC link 16 providing a neutral point N. A converter circuit 20 is composed of phase branches 18, which are connected in parallel to the DC link and to the neutral point N. For each phase a, b, c (three as shown in FIG. 1), a phase branch is present. Each phase branch 18 comprises an output connected to the electrical machine 14 through which the corresponding component of the output current $i_{s,abc}$ flows. At its respective output, each phase branch 18 is adapted for providing an output or stator voltage at different voltage levels. These voltage levels may be synthesized by switching the semiconductor switches 22 of the phase branches 18 accordingly.

Figure 2:
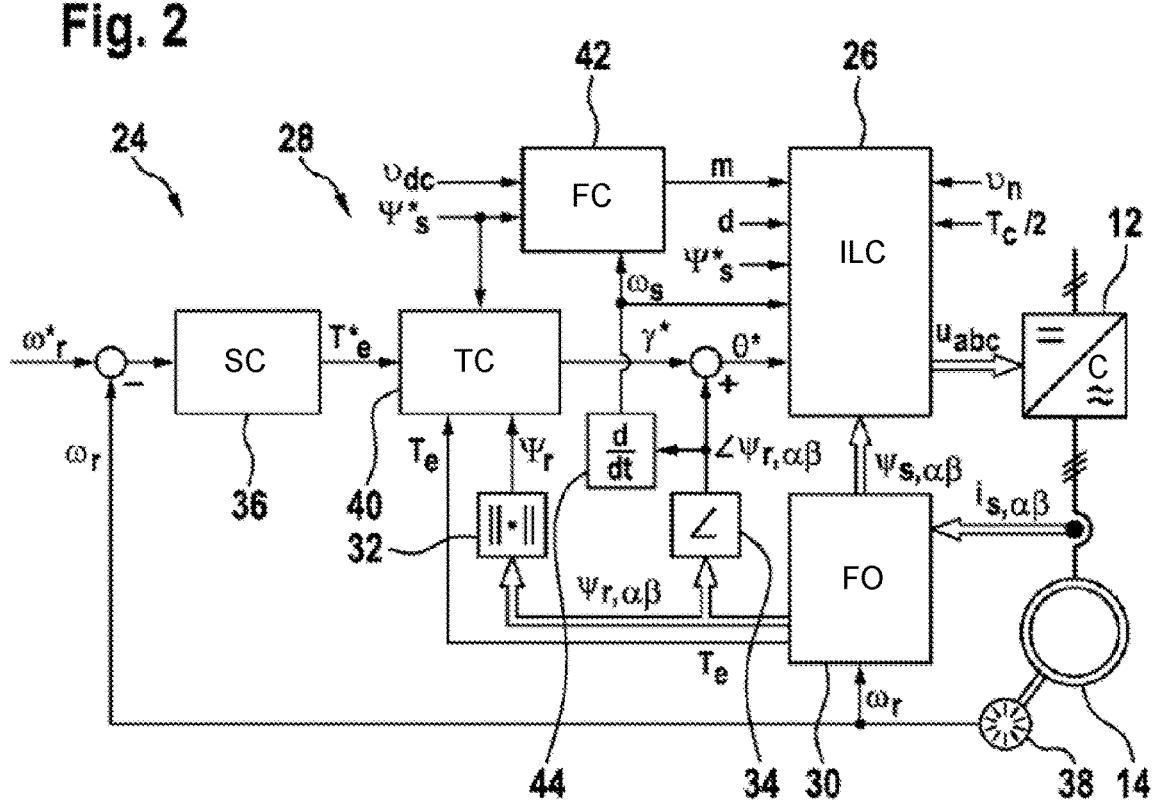
FIG. 2 shows a diagram illustrating a controller and a control method according to an embodiment of the invention.

FIG. 2 shows a diagram with components of a controller 24 for the electrical converter 12. In particular, an overall control diagram is shown, including outer control loops, the converter 12 and the load 14.

Throughout the following text, normalized quantities are used. To this end, a per unit system may be introduced. Typical base values may be the peak value of a rated phase voltage of the electrical machine 14 and/or the peak value of a rated machine current, as well as a rated fundamental frequency.

All variables $\xi_{abc}=[\xi_a\ \xi_b\ \xi_c]^T$ in the three-phase system (abc) may be transformed to $\xi_{\alpha\beta 0}=[\xi_\alpha\ \xi_\beta\ \xi_0]^T$ in the stationary orthogonal $\alpha\beta 0$-coordinate system through a Clarke transformation $\xi_{\alpha\beta 0}=K\xi_{abc}$. The inverse Clarke transformation may be given by $\xi_{abc}=K^{-1}\xi_{\alpha\beta 0}$. The transformation matrices of the Clarke and the inverse Clarke transformation may be $$K = \frac{2}{3}\begin{bmatrix} 1 & -\frac{1}{2} & -\frac{1}{2} \\ 0 & \frac{\sqrt{3}}{2} & -\frac{\sqrt{3}}{2} \\ \frac{1}{2} & \frac{1}{2} & \frac{1}{2} \end{bmatrix} \text{ and } K^{-1} = \begin{bmatrix} 1 & 0 & 1 \\ -\frac{1}{2} & \frac{\sqrt{3}}{2} & 1 \\ -\frac{1}{2} & -\frac{\sqrt{3}}{2} & 1 \end{bmatrix}. \quad (1)$$

The first two elements of $\xi_{\alpha\beta 0}$, $\xi_\alpha$ and $\xi_\beta$, are the so-called differential-mode components, whereas the third element, $\xi_0$, is the common-mode component. When only differential-mode components are required, the reduced Clarke transformation $\xi_{\alpha\beta}=\tilde{K}\xi_{abc}$ and the reduced inverse Clarke transformation $\xi_{abc}=\tilde{K}^{-1}\xi_{\alpha\beta}$ may be defined with the corresponding matrices $$\tilde{K} = \frac{2}{3}\begin{bmatrix} 1 & -\frac{1}{2} & -\frac{1}{2} \\ 0 & \frac{\sqrt{3}}{2} & -\frac{\sqrt{3}}{2} \end{bmatrix} \text{ and } \tilde{K}^{-1} = \begin{bmatrix} 1 & 0 \\ -\frac{1}{2} & \frac{\sqrt{3}}{2} \\ -\frac{1}{2} & -\frac{\sqrt{3}}{2} \end{bmatrix}. \quad (2)$$

Note that $\tilde{K}$ holds the first two rows of K, and $\tilde{K}^{-1}$ holds the first two columns of $K^{-1}$. $K^{-1}$ is the pseudo-inverse of $\tilde{K}$, in which the 0-component is implicitly assumed to be zero.

In the following text, bold variables refer either to two-dimensional vectors of the form $\xi_{\alpha\beta}=[\xi_\alpha\ \xi_\beta]^T$ or to three-dimensional vectors, such as $\xi_{\alpha\beta 0}=[\xi_\alpha\ \xi_\beta\ \xi_0]^T$ and $\xi_{abc}=[\xi_a\ \xi_b\ \xi_c]^T$.

The variable t is used to denote a continuous time axis, with $t \in \mathbb{R}$. The controller 24 may operate at regularly spaced discrete time steps or sampling time instants $kT_s$, where $k \in \mathbb{N}$ is the controller time step and $T_s$ is the controller sampling interval. For example, $T_s=25$ µs may be chosen.

The total (instantaneous) DC-link voltage may be $\upsilon_{dc}=\upsilon_{dc,up}+\upsilon_{dc,lo}$ where $\upsilon_{dc,up}$ and $\upsilon_{dc,lo}$ denote the voltages over the upper and lower DC-link capacitors, respectively. The potential $$\upsilon_n = \tfrac{1}{2}(\upsilon_{dc,lo} - \upsilon_{dc,up})$$

of the neutral point N between the two DC-link capacitors may float.

The electrical converter 12 may produce three voltage levels at its outputs with respect to the neutral point N. The voltage levels may be given by $$\left\{-\frac{\upsilon_{dc}}{2}, 0, \frac{\upsilon_{dc}}{2}\right\}.$$

These voltages can be described by the integer variables $u_x \in \{-1,0,1\}$, with $x \in \{a,b,c\}$ denoting one of the three phases. The three-phase switch position is defined as $u_{abc}=[u_a\ u_b\ u_c]^T$. In general, the switch positions $u_{abc}$ also may be seen as normalized voltage levels.

The phase voltages with respect to the neutral point N are given by $$\upsilon_x = \begin{cases} \upsilon_{dc,up}, & \text{if } u_x = 1 \\ 0, & \text{if } u_x = 0 \\ -\upsilon_{dc,lo}, & \text{if } u_x = -1, \end{cases} \quad (3)$$

The three-phase voltage is equal to $\upsilon_{abc}=[\upsilon_a\ \upsilon_b\ \upsilon_c]^T$. When the neutral point potential is close to zero, or equivalently, when the voltages over the upper and the lower DC-link capacitors in FIG. 1 are approximately equal, the three-phase voltage can be written as $$\upsilon_{abc} \approx \frac{\upsilon_{dc}}{2} u_{abc}. \quad (4)$$

In case an electrical machine is connected to the converter phase terminals, the machine's stator voltage in stationary orthogonal coordinates is $$\upsilon_{s,\alpha\beta} = \tilde{K}\upsilon_{abc}. \quad (5)$$

The machine is conveniently described by its stator and rotor flux linkage vectors in stationary orthogonal coordinates, i.e. by $\psi_{s,\alpha\beta}=[\psi_{s\alpha}\ \psi_{s\beta}]^T$ and $\psi_{r,\alpha\beta}=[\psi_{r\alpha}\ \psi_{r\beta}]^T$. $\Psi_s=\|\psi_{s,\alpha\beta}\|^T$ is the magnitude of the stator flux vector. The magnitude of the rotor flux vector $\Psi_r$ is defined accordingly. The angular frequency of the stator is denoted by $\omega_s$. Note that the stator and the rotor flux vectors rotate at this angular frequency. The electrical angular speed of the rotor is $\omega_r=p\omega_m$, where p is the number of pole pairs and $\omega_m$ is the mechanical angular speed of the rotor. The difference between $\omega_s$ and $\omega_r$ is the slip frequency.

Alternatively, when the converter is connected to an electrical grid, the stator and rotor flux linkage vectors are replaced by virtual flux vectors. Specifically, the stator flux vector is replaced by the virtual converter flux vector, and the rotor flux vector is replaced by the grid flux vector, which is typically defined at the point of common coupling (PCC).

Outer Control Loop

Returning to FIG. 2, an inner control loop 26, which generates a switch position signal $u_{abc}$, is supplied by an outer control loop 28 with the modulation index m, a pulse number d, a stator flux reference magnitude $\Psi^*_s$, a stator flux reference angle $\theta^*$ and an estimated stator flux vector $\psi_{s,\alpha\beta}$. Furthermore, the neutral point potential $\upsilon_n$ and the carrier interval $T_c=1/f_c$, where $f_c$ is the carrier frequency, are supplied to the inner control loop.

As described below, the inner control loop may either determine the switch position signal $u_{abc}$ based on optimized pulse patterns or on (carrier-based) pulse width modulated switching patterns depending on the pulse number d.

The outer control loop 28 operates as following:

Based on the measured stator current vector $i_{s,\alpha\beta}$ and the stator voltage $\upsilon_{s,\alpha\beta}$, the flux observer 30 estimates the estimated stator flux vector $\psi_{s,\alpha\beta}$, the estimated rotor flux vector $\psi_{r,\alpha\beta}$ and the estimated electromagnetic torque $T_e$. From the estimated rotor flux vector $\psi_{r,\alpha\beta}$, its magnitude $\Psi_r$ and its angle position $\sphericalangle\psi_{r,\alpha\beta}$ are determined with blocks 32, 34.

The speed controller 36 regulates the (electrical) angular speed $\omega_r$ of the rotor along its reference $\omega^*_r$ by manipulating the setpoint of the electromagnetic torque $T^*_e$. The angular speed $\omega_r$ may be determined by an encoder 38, which measures the speed of the rotor of the electrical machine 14.

The torque controller 40 manipulates the desired load angle $\gamma^*$, i.e. the desired angle between the stator flux vector and the rotor flux vector. The torque controller 40 requires the reference of the stator flux magnitude $\Psi^*_s$ and the actual magnitude of the rotor flux vector $\Psi_r$.

The flux controller 42 maintains the magnitude of the stator flux vector close to its reference $\Psi^*_s$ by manipulating the modulation index m. In its simplest form, the feedforward term $$m = \frac{2}{\upsilon_{dc}} \omega_s \Psi^*_s \quad (6)$$

can be used for this purpose. In (6), $\upsilon_{dc}$ is the (instantaneous) total DC-link voltage and $\omega_s$ denotes the angular stator frequency. The angular stator frequency $\omega_s$ is determined in block 44 and is the angular speed at which the flux vectors rotate.

Optimized Pulse Patterns

The inner control loop 26 will either use optimized pulse patterns or pulse width modulated switching patterns for determining the switch position signal $u_{abc}$. This is dependent on the pulse number d. For a pulse number d smaller as a threshold, optimized pulse patterns are used, while for a pulse number d higher as the threshold, the pulse width modulated switching patterns are used.

The use of optimized pulse patterns with high pulse numbers (for example in excess of d=20) may face the following practical limitations: (i) the offline computation of such optimized pulse patterns may be demanding and time consuming, (ii) these optimized pulse patterns may require a significant amount of storage capacity in the controller memory, and (iii) the incentive to use optimized pulse patterns diminishes, as the harmonic benefit of optimized pulse patterns over established modulation methods is significantly reduced at high pulse numbers. Thus it may be beneficial to determine pulse width modulated switching patterns online.

The need to operate at high pulse numbers arises naturally when operating at low fundamental frequencies. In drive applications, low fundamental frequencies correspond to low-speed operation. In power converters, the semiconductor losses and the adopted cooling technology usually impose an upper bound $f_{sw,max}$ on the switching frequency. When the fundamental frequency $f_1$ varies, the pulse number needs to be adjusted according to $$d = \text{floor}\left(\frac{f_{sw,max}}{f_1}\right) \tag{7}$$

Thus, as the fundamental frequency reduces with lowering the drive speed, the required pulse number d increases, theoretically towards infinity at zero fundamental frequency.

The switching angles and switch positions of an optimized pulse pattern may be computed for one phase over a quarter of a fundamental period, assuming quarter- and half-wave symmetry and 1200 phase shift between the three phases. The number of (primary) switching angles over a quarter period is the so called pulse number d, which is a natural number. For three-level optimized pulse patterns and a neutral point clamped converter 12, the switching frequency of a semiconductor device may be given by $$f_{sw} = df_1, \tag{8}$$

where $f_1$ denotes the frequency of the fundamental component.

Figure 3:
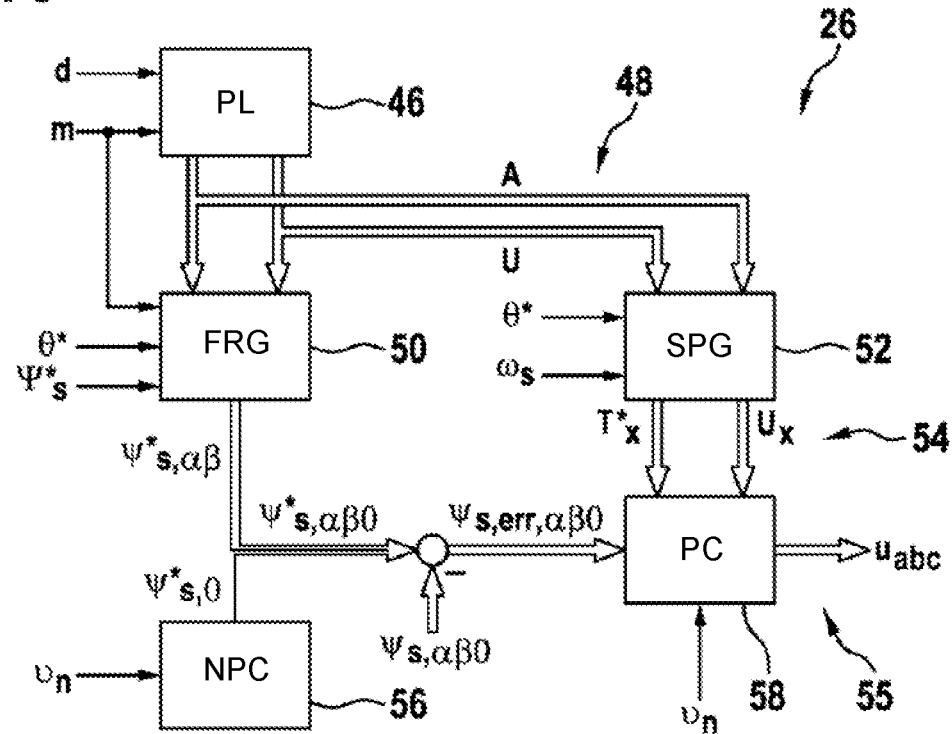
FIG. 3 shows a diagram illustrating a part of the controller and the control method of FIG. 2.

FIG. 3 shows the parts of the inner control loop 26, which are used for the storage, retrieval and modification of optimized pulse patterns.

The pattern loader 46 provides an operating point specific optimized pulse pattern 48, which is determined by the modulation index m and the pulse number d. In order to ensure that the switching frequency does not exceed its maximum $f_{sw,max}$, the pulse number d may be selected as the largest integer that does not exceed $f_{sw,max}/f_1$ through (7).

The pattern loader 46 provides the vector of d primary switching angles $A=[\alpha_1\ \alpha_2\ \ldots\ \alpha_d]^T$ and the corresponding vector of single-phase switch positions $U=[u_1\ u_2\ \ldots\ u_d]^T$. The latter is commonly referred to as the (single-phase) switching sequence. A three-phase optimized pulse pattern 48 over a complete period may be constructed based on the vectors A and U by using quarter- and half-wave symmetry.

A flux reference generator 50 may determine the stator flux reference $\psi^*_{s,\alpha\beta}$ from the vectors A and U as well as the modulation index m, the stator flux reference magnitude $\psi^*_s$ and the stator flux reference angle provided by the outer control loop 28. The stator flux reference $\psi^*_{s,\alpha\beta}$ with the magnitude $\Psi^*_s$ and the angle (where the notation $\sphericalangle\xi_{\alpha\beta}$ is used to denote the angular position of the vector $\xi_{\alpha\beta}$)

$$\theta^* = \sphericalangle\psi_{r,\alpha\beta} + \gamma^* \tag{9}$$

may be derived by integrating over time the voltage waveform of the optimized pulse pattern 48. Alternatively, the stator flux reference $\psi^*_{s,\alpha\beta}$ may be derived from the corner points of the stator flux reference trajectory, which may be computed offline and stored in a look-up table.

Additionally, a common-mode flux reference component $\psi^*_{s0}$ may be added to the stator flux reference $\psi^*_{s,\alpha\beta}$ in order to control the neutral point potential $\upsilon_n$. Such a common-mode flux reference component $\psi^*_{v0}$ may be determined by a neutral point controller 56, which may monitor the deviation of the neutral point potential through a virtual common-mode flux error. By correcting it, in effect, a common-mode voltage is injected that drives the neutral point potential $\upsilon_n$ to its reference.

The instantaneous stator flux error $$\psi^*_{s,err,\alpha\beta0} = \psi^*_{s,\alpha\beta0} - \psi^*_{s,\alpha\beta0} \tag{10}$$

is determined as the difference between the stator flux reference $\psi^*_{s,\alpha\beta0}$ and its estimate $\psi_{s,\alpha\beta0}$, of which the $\alpha\beta$ components are provided by the outer control loop 28.

With a switching pattern generator 52, switching patterns 54 are constructed that hold in each phase the upcoming switching transitions. More specifically, the vector of single-phase switch positions $$U_x = [u_{x1} u_{x2} \ldots u_{xn_x}]^T \tag{11}$$

with $n_x$ entries is constructed for the phase x, with $x \in \{a,b,c\}$. The nominal switching angles relative to the angle reference $\theta^*$ are translated into nominal switching time instants or transition time instants (relative to the current time instant) by dividing them by the angular stator frequency $\omega_s$. This leads to the corresponding vector of nominal transition time instants $$T^*_x = [t^*_{x1} t^*_{x2} \ldots t^*_{xn_x}]^T \tag{12}$$

The pair $U_x$ and $T^*_x$ forms the switching pattern 54 for phase x. A transition time instant $t^*_{xi}$ and its corresponding switch position $u_{xi}$ may be seen as a switching transition. The pair $U_x$ and $T^*_x$ may be seen as a sequence of switching transitions.

The pattern controller 58 receives the switching pattern 54 and manipulates the transition time instant $t^*_{xi}$ to reduce the stator flux error $\psi_{s,err,\alpha\beta0}$. In doing so, the stator flux vector is controlled along its reference trajectory and closed-loop control of the stator flux error $\psi_{s,err,\alpha\beta0}$ is achieved. The optimization of the switching pattern 54 will be described in more detail with respect to FIG. 4. The result is a modified switching pattern.

In the present case of a three-phase converter 12, the modified switching pattern (as well as the switching pattern 54) can be interpreted as a sequence of three-phase switch positions $u_{abc} = [u_a\ u_b\ u_c]^T$. The (integer) three-phase switch position 55 for the first sampling time interval is computed from the modified switching pattern and applied to the converter 12. At the next sampling instant, the modified switching pattern is recomputed, in accordance with the receding horizon policy.

Pulse Width Modulated Switching Pattern

Figure 4:
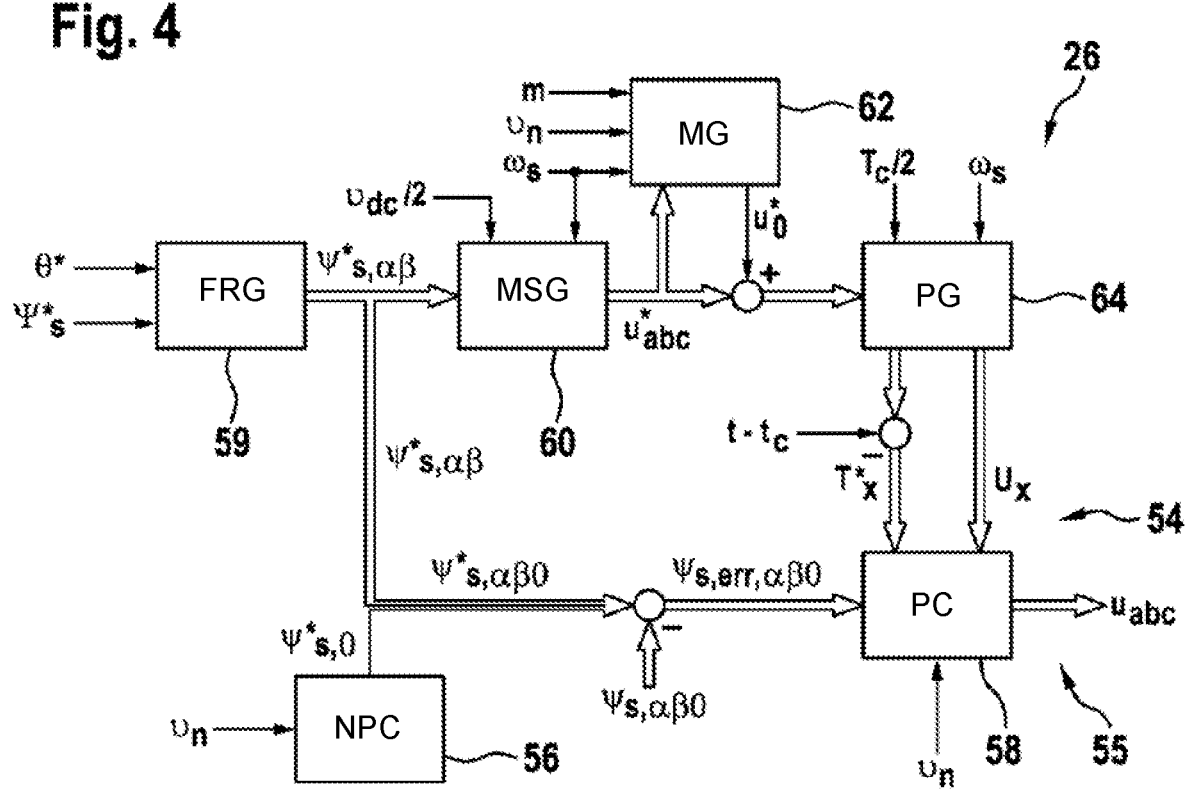
FIG. 4 shows a diagram illustrating a part of the controller and the control method of FIG. 2.

FIG. 4 shows the parts of the inner control loop 26, which are used, when the pulse number d is higher than the threshold. In this case, the switching patterns 54 determined from offline computed optimized pulse patterns 48 are replace with online generated switching patterns 54, which are based on pulse width modulation.

However, the same pattern controller 58 is used again. Also the pulse width modulated switching patterns 54 are modified by moving the transition time instants $t^*_{xi}$ to control the stator flux of the machine 12. Switching to another control loop is avoided. Only the switching pattern 54 is changed, which may be compared to a switch between two optimized pulse patterns 48 with different pulse numbers.

In the case of FIG. 4, a flux reference generator 59 determines the stator flux reference vector $\psi^*_{s,\alpha\beta}$ directly from the stator flux reference magnitude $\Psi^*_s$ and the stator flux reference angle $\theta^*$ provided by the outer control loop 24. A common-mode flux reference component $\psi^*_{s0}$ may be added to the stator flux reference vector $\psi^*_{s,\alpha\beta}$ as described with respect to FIG. 3. The stator flux $\psi^*_{s,err,\alpha\beta0}$ may be determined as described with respect to FIG. 3.

In summary, a modulating signal generator 60 determines from the stator flux reference vector $\psi^*_{s,\alpha\beta}$ a modulating signal vector $u^*_{abc}$, which may be generated as a differential-mode modulating signal vector $u^*_{abc}$. A common-mode generator 62 may generate and add a common-mode component $u^*_0$ to the modulating signal vector $u^*_{abc}$. A pattern generator 64 then generates the switching pattern 54 online from the modulating signal vector $u^*_{abc}$ based on (for example carrier-based) pulse width modulation.

In the following, the controller blocks 59, 60, 62, 64 and 58 will be described in more detail.

Differential-Mode Modulating Signal Generation

When the pulse number d is high, the ratio between the switching frequency and the fundamental frequency is high. Thus, the stator flux trajectory may be approximated by a circle, thus simplifying the implementation of the flux reference generator 59.

Given the stator flux reference in terms of its angle $\theta^*$, see (9), and magnitude $\Psi^*_s$, the stator flux reference vector $\psi^*_{s,\alpha\beta}$ in stationary orthogonal coordinates directly follows to $$\psi^*_{s,\alpha\beta} = \Psi^*_s \begin{bmatrix} \cos(\theta^*) \\ \sin(\theta^*) \end{bmatrix}. \tag{13}$$

During steady-state operation, the reference angle is given by $\theta^* = \omega_s t$, where $\omega_s$ is the angular stator frequency. Therefore, the stator flux vector rotates with $\omega_s$. The stator flux reference vector $\psi^*_{s,\alpha\beta}$ is computed by the flux reference generator 59 based on (13).

Neglecting the stator resistance, the stator voltage is the derivative of the stator flux:

$$v^*_{s,\alpha\beta} = \frac{d}{dt}\psi^*_{s,\alpha\beta} \tag{14}$$

Inserting (13) into (14) leads to $$v^*_{s,\alpha\beta} = \Psi^*_s \omega_s \begin{bmatrix} -\sin(\theta^*) \\ \cos(\theta^*) \end{bmatrix} = \omega_s \begin{bmatrix} 0 & -1 \\ 1 & 0 \end{bmatrix} \psi^*_{s,\alpha\beta} \tag{15}$$

where it was used that the time derivative of the reference angle $\theta^*$ is the angular stator frequency $\omega_s$. The stator voltage reference is thus equal to the stator flux reference rotated forward by 90 degrees and scaled by the angular stator frequency.

To obtain the three-phase (differential-mode) modulating signal vector $u^*_{abc}$, it is used that the converter voltage is equal to the stator voltage, see (5). Assuming the neutral point potential $v_n$ to be zero, and according to (4), the three-phase modulating signal vector $u^*_{abc}$ is scaled by half the total DC-link voltage $v_{dc}$. This leads to $$u^*_{abc} = \frac{2}{v_{dc}} \tilde{K}^{-1} v^*_{s,\alpha\beta}. \tag{16}$$

The modulating signal generator 60 determines from the stator flux reference vector $\psi^*_{s,\alpha\beta}$ the modulating signal vector $u^*_{abc}$ based on (15) and (16).

Common-Mode Voltage Injection

The common-mode generator 62 may generate and add a common-mode component $u^*_0$ to the modulating signal vector $u^*_{abc}$. In general, the common-mode component $u^*_0$ may be added to the modulating signal vector $u^*_{abc}$ via $u^*_{abc} + u^*_0$ or via $$u^*_{abc} = K^{-1} \begin{bmatrix} u^*_{\alpha\beta} \\ u^*_0 \end{bmatrix}.$$

One may distinguish between operation at very low speed and operation in the remaining (normal) operating range. At very low speed, the objective may be twofold: (1) avoidance of overly narrow switching pulses that violate the minimum on-time and must be typically dropped, and (2) avoidance of an uneven distribution of the semiconductor losses between the upper and the lower halves of the converter 12. In normal speed operation, the current distortions may be reduced by injecting an appropriate common-mode voltage.

Low-Speed Common-Mode Voltage Injection

When operating at very low speed and correspondingly very low modulation indices, such as $m \in [0,0.02]$, the modulating signal vector $u^*_{abc}$ may have a very small amplitude. As a result, the switch positions or the voltage levels are mostly zero with short positive (negative) pulses during the positive (negative) half-wave of the modulating signal vector $u^*_{abc}$. These pulses may have to meet a certain minimum width in time, the so called on-time. In high-power converters, the minimum on-time can be as long as $t_{min} = 50$ µs. Pulses of width between 0 and $t_{min}$ may be either extended to $t_{min}$ or removed by a post processing unit. As a result, switching may be avoided altogether when operating at very low modulation indices m, jeopardizing closed-loop control of the machine currents and flux vectors.

To avoid a dropping of pulses, a suitable common-mode component $u^*_0$ may be injected. For instance, when operating at a small (non-negative) modulation index $m \ll 1$, the positive common-mode signal $$u^*_0 = m + \frac{t_{min}}{T_c} \tag{17}$$

may shift the modulating signal vector $u^*_{abc}$ into the positive half and ensures that the minimum pulse width of $t_{min}$ is met. Note that the offset $t_{min}/T_c$ in (17) may directly result from the rule of proportions applied to the carrier interval and the modulating signals.

The second issue, the uneven distribution of the semiconductor losses, may be caused by the low fundamental frequency. For a sinusoidal carrier-based pulse width modulation, during half the fundamental period, only the switches in the upper (or the lower) converter half may be used. To mitigate this issue, the injection of a sufficiently large common-mode signal as in (17) may be used to periodically shift the semiconductor losses between the two converter halves. This approach may distribute the losses more evenly, avoiding the need to derate the converter or to lower the switching frequency.

As a side effect, an offset in the modulating signal adds a bias to the neutral point current, thus increasing or decreasing the neutral point potential $v_n$. More specifically, in motoring mode, a positive $u^*_0$ leads to a positive drift, $dv_n(t)/dt>0$, whereas in generating mode a negative drift results. By flipping the sign of the common-mode term, the sign of the derivative of the neutral point potential $v_n$ can be reversed. This relation between $u^*_0$ and $dv_n(t)/dt$ may be exploited to construct a hysteresis controller that keeps the neutral point potential $v_n$ within a pre-defined interval $[v_{n,min}, v_{n,max}]$. Symmetrical bounds, i.e. $v_{n,max}=-v_{n,min}$ may be chosen.

An example of such a hysteresis controller is $$\sigma_0(k) = \begin{cases} -\sigma_p(k) & \text{if } v_n(k) \geq v_{n,max} \\ \sigma_p(k) & \text{if } v_n(k) \leq v_{n,min} \\ \sigma_0(k-1) & \text{otherwise} \end{cases} \quad (18)$$

operating at the discrete time steps $k \in \mathbb{N}$, where $\sigma_p(k) \in \{-1,1\}$ is the sign of the electrical power flow. By definition, the power flow is positive i motoring operation and negative in generating mode. The output of the hysteresis controller is the integer $\sigma_0(k) \in \{-1,1\}$. The to-be-injected common-mode component is then $$u^*_0(k) = \hat{u}_0 \sigma_0(k), \quad (19)$$

where the non-negative scalar $\hat{u}_0$ is a design parameter. For the modulation indices considered at low-speed operation, $\hat{u}_0 \gg m+t_{min}/T_c$ may be chosen.

The choice of $\hat{u}_0$ is a trade-off between two considerations. On the one hand, for $\hat{u}_0=0$, the neutral point potential $v_n$ is characterised by a ripple with a particularly strong third harmonic component. On the other hand, a non-zero DC-offset $\pm \hat{u}_0$ adds to this ripple a linear increase or decrease of the neutral point potential $v_n$ over time. For large $\hat{u}_0$, this linear trend dominates over the ripple, thus facilitating the use of the hysteresis controller (18) and (19). However, an overly large $\hat{u}_0$ requires frequent flipping of the sign $\sigma_0$ and increases the current distortions.

The selection of $\hat{u}_0$ is thus determined by the magnitude of neutral point potential ripple and the degradation of harmonic performance.

Determining the sign of the power flow $\sigma_p$ might be erroneous at low electrical power, owing to errors in the current and voltage measurements. An alternative hysteresis controller avoids the dependency on $\sigma_p$, by simply reversing the sign whenever the bound is exceeded. This simplifies (18) to $$\sigma_0(k) = \begin{cases} -\sigma_0(k-1) & \text{if } |v_n(k)| \geq v_{n,max} \\ \sigma_0(k-1) & \text{otherwise} \end{cases}. \quad (20)$$

This control scheme, which balances the neutral point potential $v_n$ at low-speed operation while ensuring switching pulses of a minimum width may be implemented by the common-mode generator 62 according to (19) with (18) or (20).

Normal-Speed Common-Mode Voltage Injection

At higher modulation indices, say $m>0.02$, the issue of overly short switching pulses is not present. Instead, it may be expedient to inject an appropriate common-mode component to the modulating signal to reduce the current distortions.

During normal speed operation one or more of the following terms may be added as common-mode component to the modulating signal vector $u^*_{abc}$:

$$u^*_0 = \frac{m}{6}\sin(3\omega_1 t + \phi_1) \quad (21)$$

$$u^*_0 = -\frac{1}{2}(\min(u^*_{abc}) + \max(u^*_{abc})) \quad (22)$$

$$u^*_0 = \bar{u}^*_0 + \frac{1}{2} - \frac{1}{2}(\min(\bar{u}^*_{abc}) + \max(\bar{u}^*_{abc})). \quad (23)$$

The first term (21) is a sinusoidal signal with the amplitude $m/6$, three times the angular fundamental frequency $\omega_1 = 2\pi f_1$ and the same phase $\phi_1$ as the modulating signal. The addition of the second term (22) centers the three-phase modulating signal around zero. As a result, at any given time instant, $-\min(u^*_{abc}+u^*_0)=\max(u^*_{abc}+u^*_0)$ holds. The third term (23) is based on the scalar and three-phase terms $$\bar{u}^*_0 = -\frac{1}{2}(\min(u^0_{abc})+\max(u^*_{abc})) \quad (24)$$

$$\bar{u}^*_{abc} = ((u^*_{abc}+\bar{u}^*_0+1) \bmod 1. \quad (25)$$

Note that the term (24) is the same as in (22). The expression $\xi \bmod 1$ in (25) is defined as the remainder of the Euclidean division of $\xi$ by one. The result is bounded between zero and one.

Any one of the three common-mode terms increases the linear modulation region from $m=1$ to $1.155$. They also tend to reduce the current distortions.

During normal-speed operation, the common-mode generator 62 may implement the generation according to (21), (22) or (23).

As a further example, control of the neutral point potential $v_n$ may be achieved by manipulating the common-mode component $u^*_0$ of the modulating signal vector $u^*_{abc}$. A positive common-mode component $u^*_0$, for example, shifts the phase voltages to the upper converter half. Depending on the sign of the phase current (or the direction of the power flow), this shift adds a positive or negative bias to the average current drawn from the neutral point, which, in turn, modifies the neutral point potential $v_n$.

Figure 5:
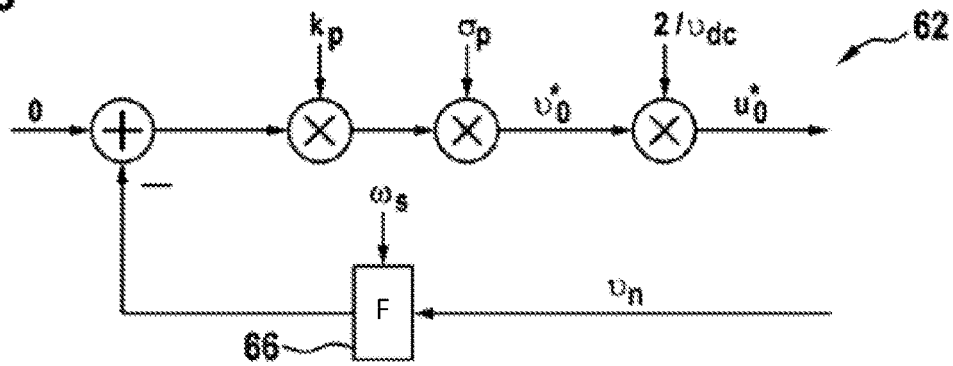
FIG. 5 shows a diagram illustrating a common-mode controller used in the control method of FIG. 2.

FIG. 5 shows an example of such a controller 62. The neutral point potential $v_n$ is low-pass filtered with a filter 66, whose cut-off frequency is adapted in accordance with the angular stator frequency $\omega_s$. The filtered error of the neutral point potential $v_n$ is fed to a proportional controller with the gain $k_p$ and multiplied by the sign of the electrical power flow $\sigma_p$. The resulting common-mode voltage reference $v^*_0$ is scaled by half the DC-link voltage $v_{dc}$ to obtain the common-mode component of the modulating signal.

This type of neutral point controls may tend to be slow, addressing the drift of the neutral point potential $v_n$ rather than its instantaneous value. On the other hand, instantaneous control of the common-mode voltage, and thus of the neutral point potential $v_n$, may be achieved by exploiting the redundancy in the voltage vectors.

Pulse Width Modulation

Pulse width modulation translates the modulating signal vector $u^*_{abc}$, which may be seen as a real-valued input signal, into the three-phase switch position vector $u_{abc}$, which may be seen as a discrete-valued output signal using pulses of fixed amplitude but variable width. The output waveform $u_{abc}$ approximates $u^*_{abc}$ regarding the magnitude and phase of its fundamental component.

An electrical converter 12 with DC-link voltage $\upsilon_{dc}$ may be used as actuator to translate the switch position vector $u_{abc}$ into the switched voltage waveform $\upsilon_{abc}$ at the converter terminals. By appropriately scaling the reference voltage $\upsilon^*_{abc}$, the converter voltage $\upsilon_{abc}$ approximates its reference $\upsilon^*_{abc}$. This principle applies to both (machine-side) inverters and (grid-side) active rectifier.

Figure 6:
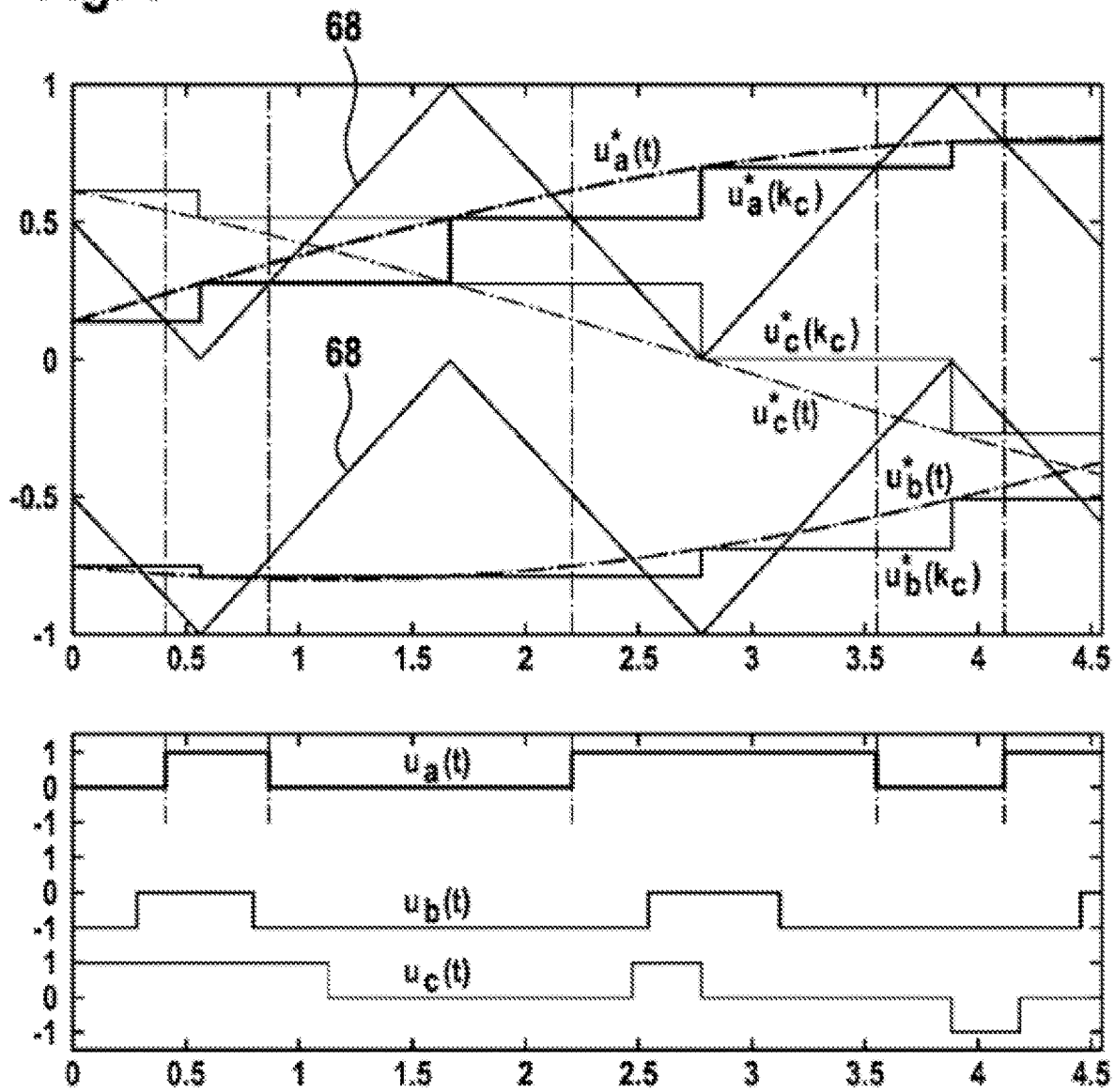
FIG. 6 shows a diagram with examples for a modulating signal vector and a switch position vector.

FIG. 6 shows a diagram with examples for a modulating signal vector $u^*_{abc}$ and a switch position vector $u_{abc}$. In this and all following diagrams the time axis is given in ms.

Carrier-based pulse width modulation for three-level (or N-level) converters is based on two (or N−1) carrier signals 68. The carrier signals 68 may have triangular waveforms with the carrier frequency $f_c$. Typically, the carrier frequency is (significantly) higher than the fundamental frequency, i.e. $f_c \gg f_1$. The peak-to-peak magnitude of each carrier signal 68 is one. For a three-level converter, the carrier signals 68 are arranged such that they cover the range from −1 to 1 without overlapping. The phase shift between the two carrier signals is a design parameter. When choosing phase disposition, the two carrier signals are in phase, whereas in the phase opposite disposition, their phases are shifted by 180° with respect to each other. The former option is commonly used, because it results in lower harmonic distortions. The carrier interval $$T_c = \frac{1}{f_c} \qquad (26)$$

is the time interval between the upper peaks of the carrier signal. The three phases a, b, c use the same carrier signals 68.

Using asymmetric regular sampling and a carrier interval $T_c$, a carrier signal 68 may be sampled every 0.5 $T_c$ at the discrete time steps $k_c 0.5 T_c$, $k_c \in \mathbb{N}$. In general, the subscript c refers to "carrier".

Carrier-based pulse width modulation is achieved by comparing each component $u^*_a$, $u^*_b$ and $u^*_c$ of the modulating signal vector $u^*_{abc}$ with the two (or more) carrier signals 68. In phase a, for example, the switch position $u_a$ is chosen based on the modulating signal $u^*_a$ and the following three rules:

When $u^*_a$ is less than both carrier signals, choose $u_a = -1$.

When $u^*_a$ is less than the upper carrier signal, but exceeds the lower one, select $u_a = 0$.

When $u^*_a$ is greater than both carrier signals, choose $u_a = 1$.

In a digital implementation, $u^*_{abc}$ is a sampled signal, giving rise to regularly sampled pulse width modulation. With symmetric sampling, the modulating signal is sampled once per carrier interval $T_c$, for example, at the upper triangular peaks. Throughout the remainder of the carrier interval, the modulating signal is held constant. With asymmetric sampling, the modulating signal is sampled twice per carrier interval, i.e. at the upper and at the lower peaks of the carrier. The modulating signal is held constant for half the carrier interval.

In FIG. 6, the dashed lines are continuous modulating signals, while the solid lines show asymmetric regularly sampled modulating signals.

Consider phase disposition and asymmetric sampling. The sampling instants of the modulating signal may be defined as $t_c = 0.5 T_c k_c$, with $k_c \in \mathbb{N}$ being the discrete time step. Switching is performed when the sampled modulating signal $u^*_{abc}(k_c)$ intersects with a carrier signal. This time instant (relative to the sampling instant $t_c$) is the switching instant or transition time instant. For phase a, for example, the variable $t_a$ is introduced to denote the switching instant. The switching instants and the new switch positions can be derived as a function of the polarity of the modulating signal and the carrier slope.

The switching instants or transition time instants are shown in FIG. 6 as vertical dashed lines. The resulting time evolution of the switching position $u_{abc}$ is shown below.

Online Generation of Pulse Width Modulated Switching Pattern

Figure 7:
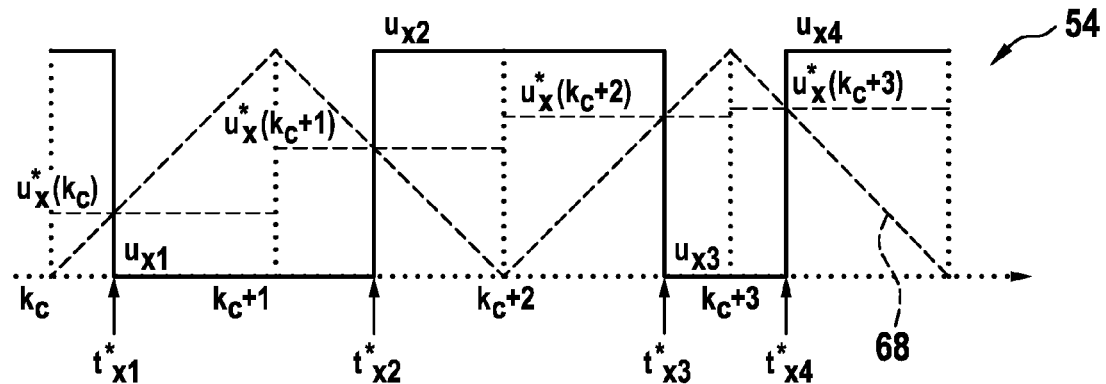
FIG. 7 shows a diagram with an example of a switching pattern used in the control method of FIG. 2.

The pattern generator 64 in FIG. 4 generates a switching pattern 54 that is composed of the pair of vectors $T^*_x$ and $U_x$ for each phase $x \in \{a,b,c\}$. The vectors $T^*_x$ contains the nominal transition time instants, whereas the vector $U_x$ contains the single-phase switch positions or voltage levels of phase x. The definitions of these vectors is provided in (11) and (12). The switching patterns 54 are updated at the discrete time steps $k_c$, as indicated in FIG. 7. Each switching pattern 54 spans a prediction horizon of K carrier half-intervals from $0.5 T_c k_c$ to $0.5 T_c(k_c + K - 1)$. The time step $\ell_c$ denotes these half-intervals, where $\ell_c \in \{0, 1, \ldots, K-1\}$.

To compute the switching pattern 54 at time step $k_c$, the sampled modulating signal $u^*_{abc}(k_c)$ is translated into the $\alpha\beta 0$-coordinate system through the Clarke transformation matrix K, see (1), and then rotated forward $\ell_c$ times assuming a constant angular frequency $\omega_s$. This allows one to predict future samples of the modulating signal at time steps $k_c + \ell_c$ according to $$u^*_{abc}(k_c + \ell_c) = K^{-1} \begin{bmatrix} \cos(\rho) & -\sin(\rho) & 0 \\ \sin(\rho) & \cos(\rho) & 0 \\ 0 & 0 & 1 \end{bmatrix} K u^*_{abc}(k_c), \qquad (27)$$

where $\ell_c \in \{0, 1, \ldots, K-1\}$ and $\rho = \omega_s 0.5 T_c \ell_c$. Recall that $K^{-1}$ is the matrix of the inverse Clarke transformation.

Figure 8:
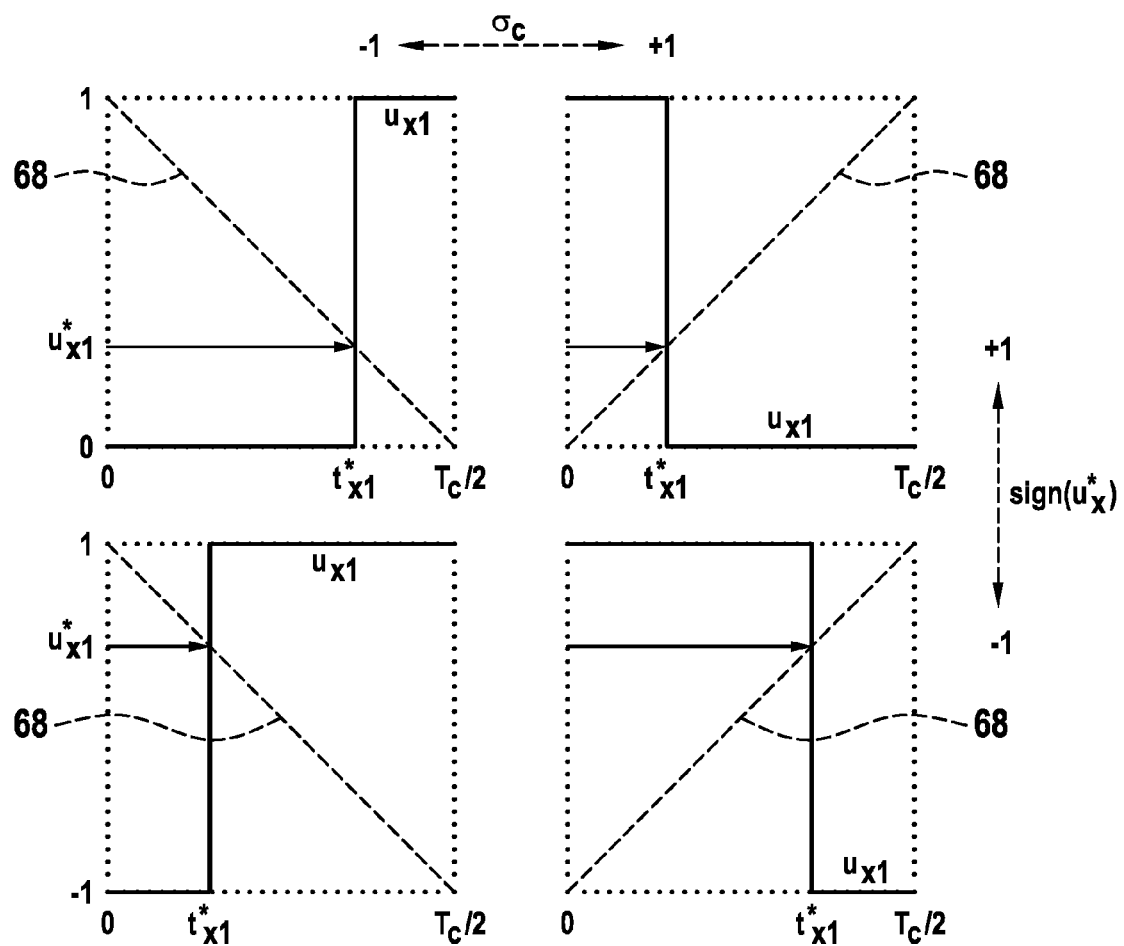
FIG. 8 shows a diagram indicating how switching transitions may be determined in the control method of FIG. 2.

The integer variable $\sigma_c(k_c + \ell_c) = (-1)^{(k_c + \ell_c)}$, with $\sigma_c \in \{-1, 1\}$, indicates the sign of the carrier slope at time step $k_c + \ell_c$. The nominal switching instants relative to the time instant $t_c$ are obtained through linear mappings of the modulating signals $u^*_a$, $u^*_b$, $u^*_c$. This mapping needs to be done depending on the polarity of the modulating signal and the carrier slope. This leads to four different cases for the first carrier half-interval (with $\ell_c = 0$) as shown in FIG. 8. The $(\ell_c + 1)$th switching transition in phase x occurs at the nominal time instant $$t^*_{x(\ell_c + 1)} = 0.5 T_c \ell_c + \qquad (28)$$
$$\frac{T_c}{2} \begin{cases} (1 - u^*_x(k_c + \ell_c)) & \text{if } u^*_x(k_c + \ell_c) \geq 0 \text{ and } \sigma_c(k_c + \ell_c) = -1 \\ u^*_x(k_c + \ell_c) & \text{if } u^*_x(k_c + \ell_c) \geq 0 \text{ and } \sigma_c(k_c + \ell_c) = 1 \\ (-1)u^*_x(k_c + \ell_c) & \text{if } u^*_x(k_c + \ell_c) < 0 \text{ and } \sigma_c(k_c + \ell_c) = -1 \\ (1 + u^*_x(k_c + \ell_c)) & \text{if } u^*_x(k_c + \ell_c) < 0 \text{ and } \sigma_c(k_c + \ell_c) = 1 \end{cases}.$$

The new switch positions are identified based on the polarity of the modulating signal $$\sigma_x(u^*_x) = \begin{cases} 1 & \text{if } u^*_x \geq 0 \\ -1 & \text{if } u^*_x < 0 \end{cases}$$

and the sign of the carrier slope $\sigma_c$. Thus, $$u_{x(\ell_c+1)} = \frac{1}{2}(\sigma_x(u^*_x(k_c+\ell_c)) - \sigma_c(k_c+\ell_c)). \quad (29)$$

Figure 9:
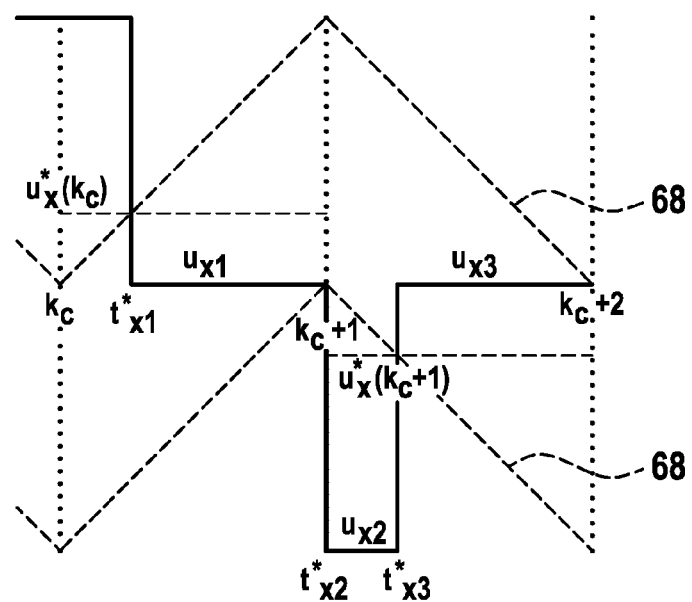
FIG. 9 shows a diagram indicating how additional switching transitions may be determined in the control method of FIG. 2.

Additional switching transitions might occur at time step $k_c+\ell_c$ when the modulating signal changes its sign. An example is shown in FIG. 9, where an additional watching transition occurs at the time step $k_c+1$. These additional transitions need to be captured and included when generating the witching patterns 54.

Pattern Controller

Figure 10:
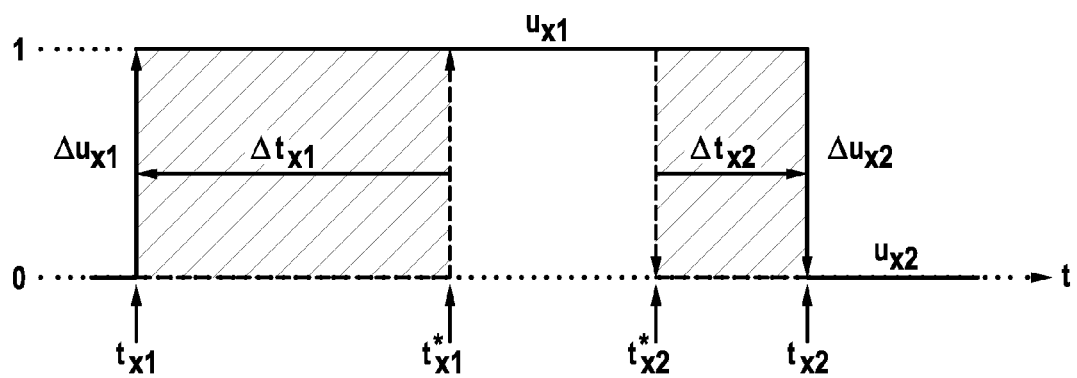
FIG. 10 shows a diagram indicating how switching transitions may be moved in the control method of FIG. 2.

The pattern controller 58 manipulates the switching instants of the switching pattern 54 to achieve fast closed-loop control of the stator flux. FIG. 10 shows an example how switching instants may be moved by the pattern controller 58.

As an example, a pattern controller based on deadbeat control is described in the following.

The pattern controller 58 operates at the sampling instants $t=kT_s$, where $T_s \ll T_c$. The inputs to the pattern controller 58 are the flux error $\psi_{s,err,\alpha\beta 0}$ and a switching pattern 54 with the pair of vectors $T^*_x$ and $U_x$ as defined in (11) and (12) for each phase x, with $x \in \{a,b,c\}$.

The vector $T=[t^*_{x1} \ t^*_{x2} \ \ldots \ t^*_{xn_s}]^T$ captures the nominal, unmodified switching instants. In the case of FIG. 4, where a pulse width modulated switching pattern 54 is generated, these switching instants are given relative to the carrier sampling instant $t_c$. At the input to the pattern controller 58, the nominal switching instants are redefined as $t^*_{xi} = t^*_{xi} - (t-t_c)$. As a result, by subtracting the time interval $t-t_c$, the nominal switching instants in $T^*_x$ are defined relative to the current time instant t. In the case of FIG. 3, when using optimized pulse patterns, no modification of $T^*_x$ is required.

The vector $U_x$ contains the single-phase switch positions of phase x. To denote changes in the switch positions, for phase x the ith switching transition is introduced $$\Delta u_{xi} = u_{xi} - u_{x(i-1)}$$

from the switch position $u_{x(i-1)}$ to $u_{xi}$. Typically, $\Delta u_{xi}$ is limited to $\{-1,1\}$, but $\{-2,-1,1,2\}$ etc. is also possible during large transients and disturbances.

The deadbeat control algorithm of the pattern controller 58 is summarized in the following.

Step 1. The required stator flux correction is translated from $\alpha\beta 0$ to abc according to $$\Delta\psi_{s,abc} = K^{-1}\psi_{s,err,\alpha\beta 0}, \quad (30)$$

where the transformation matrix of the inverse Clarke transformation $K^{-1}$ was defined in (1).

Step 2. The flux correction is scaled by the inverse of the instantaneous DC-link voltage to make it independent thereof. To this end, $\Delta\psi'_{s,abc} = [\Delta\psi'_{sa} \ \Delta\psi'_{sb} \ \Delta\psi'_{sc}]^T$ is introduced and defined as $$\Delta\psi'_{s,abc} = \frac{2}{v_{dc}}\Delta\psi_{s,abc}. \quad (31)$$

For phase a, for example, this implies that the required volt-second modification in phase a is achieved by modifying $n_a$ switching transitions in phase a by $\Delta t_{ai}$, i.e.

$$\Delta\psi'_{sa} = -\sum_{i=1}^{n_a} \Delta u_{ai}\Delta t_{ai}. \quad (32)$$

Similar statements hold for phases b and c.

Step 3. Phase x is considered and i is set to 1. For the ith switching transition in this phase with the nominal switching instant $t^*_{xi}$ and the switching transition $\Delta u_{xi}$, the following operations are performed (see FIG. 10):

1. The desired modification $\Delta t_{xi} = -\Delta\psi^*_{sx}/\Delta u_{xi}$ is computed.
2. The switching instant is modified to $t_{xi} = t^*_{xi} + \Delta t_{xi}$.
3. The switching instant $t_{xi}$ is constrained by imposing timing constraints. For $i=1$, $0 \le t_{x1} \le t^*_{x2}$ is imposed, whereas for $i>1$, $t_{x(i-1)} \le t_{xi} \le t^*_{x(i+1)}$ is imposed.
4. The desired volt-second correction in phase x is updated by replacing $\Delta\psi'_{sx}$ with $\Delta\psi'_{sx} + \Delta u_{xi}(t_{xi}-t^*_{xi})$ While the desired volt-second correction $\Delta\psi'_{sx}$ in this phase is nonzero and a stopping criteria on i (such as $i=n_x$) has not been reached, $i=i+1$ is set and this procedure is repeated for the next switching transition. Step 3 is performed for each of the three phases.

As the deadbeat controller aims to remove the stator flux error as quickly as possible, and because corrections in the switching instants are not penalized, the deadbeat controller tends to be aggressive and it achieves fast responses during transients and disturbances. The prediction horizon is the time interval starting at the current time instant such that a certain number of switching transitions per phases is covered. In the simplest version, the prediction horizon is the shortest time interval until switching transitions in all three phases are included. In both cases, the length of the prediction horizon is time-varying.

Alternatively, an optimal control problem can be formulated with a quadratic cost function and linear constraints, which leads to a quadratic program (QP). The numerical result of the QP are the optimal modifications $\Delta t_{xi}$ of the switching instants.

Figure 11:
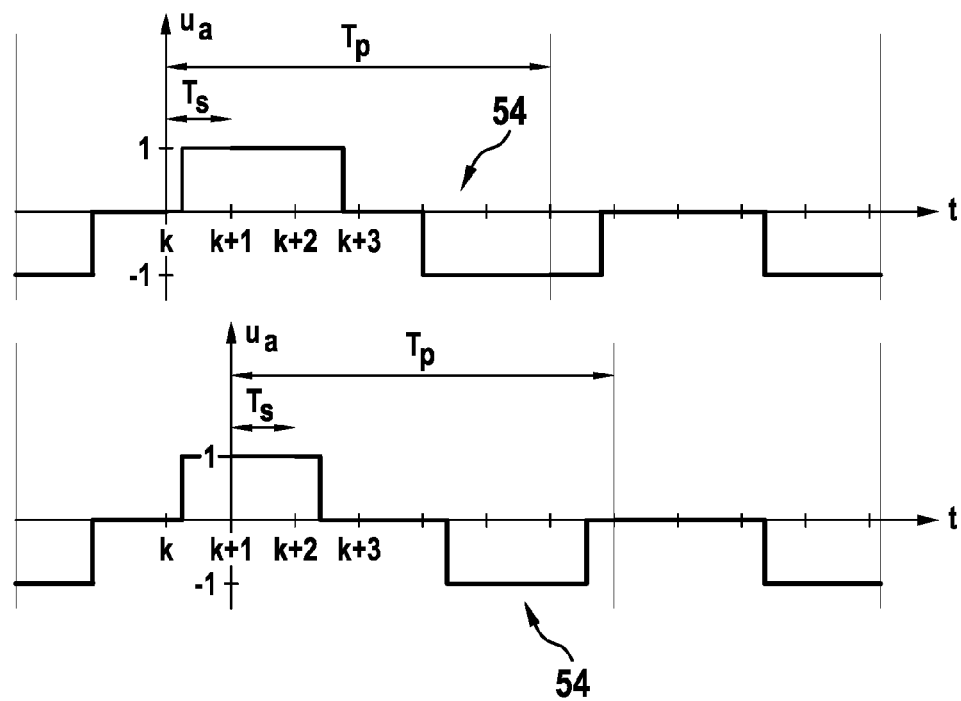
FIG. 11 shows a diagram illustrating receding horizon used in the control method of FIG. 2.

FIG. 11 shows, how the switching pattern 54 may be regularly determined at each sampling time instant $kT_s$ over a prediction horizon $T_p$. The upper part of the diagram shows the prediction horizon $T_p$ at sampling time instant $kT_s$, while the lower part shows the prediction horizon $T_p$ at sampling time instant $(k+1)T_s$. A modified pulse pattern 54 may be determined only for time interval within the moving prediction horizon $T_p$. After that, the unmodified pulse pattern may be present.

Even though at time $kT_s$ a sequence of switch positions is planned over the prediction horizon $T_p$, only the switching sequence over the sampling interval $T_s$ is applied to the converter 12. Only the part of the modified switching pattern 54 that has a length in time equal to a difference between consecutive sampling time instants may be applied to the electrical converter 12.

The predictions are recomputed at the next sampling instant $(k+1)T_s$ using new measurements; a shifted and/or revised sequence of switch positions may be derived. This is referred to as receding horizon policy. This policy provides feedback and makes the controller robust to flux observer noise and modelling errors.

Simulation Results

Figure 12A:
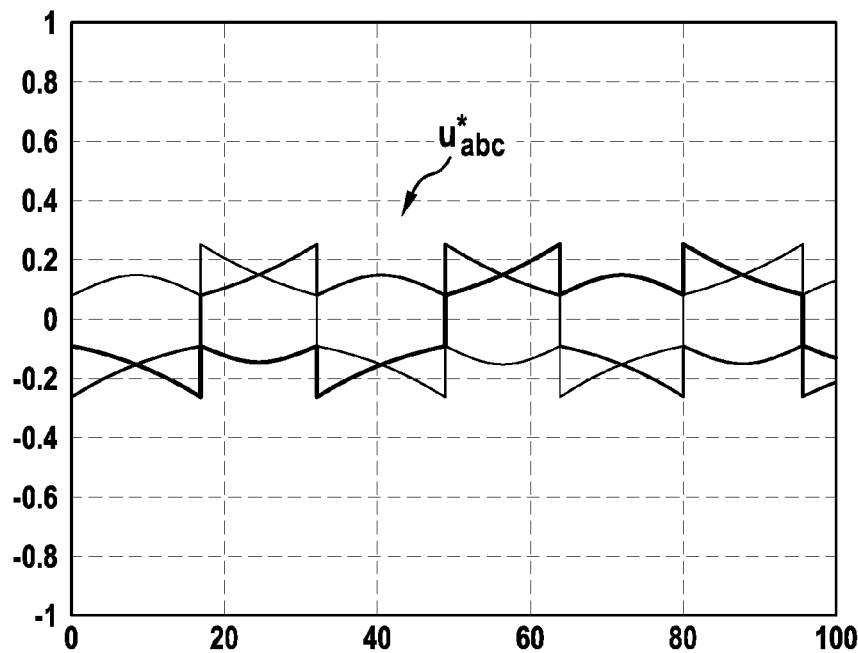
FIGS. 12a to 12d show diagrams with modulating signals, voltages, fluxes and currents produced by the method of FIG. 2 during normal-speed operation.

FIGS. 12a to 12d show quantities of a converter system 10 during normal-speed operation and under the control of the controller 24 as described above. The carrier frequency is chosen as $f_c=400$ Hz, which leads to a device switching frequency of approximately 200 Hz. FIG. 12 shows simulation results for the system 10 operating at rated torque and 20% speed with the fundamental frequency $f_1=10$ Hz. The corresponding pulse number is $d=20$. The modulating signal is shown in FIG. 12a. The common-mode component (23) is added to the modulating signal to produce switching patterns 54 that are equivalent to space vector modulation.

Figure 12B:
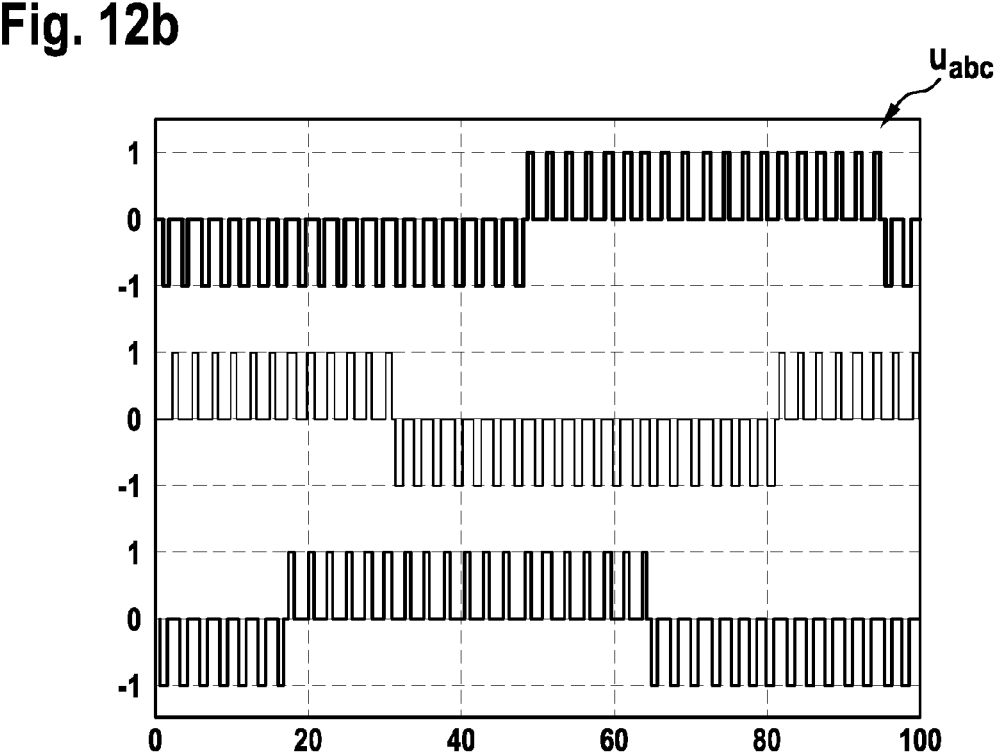
Figure 12C:
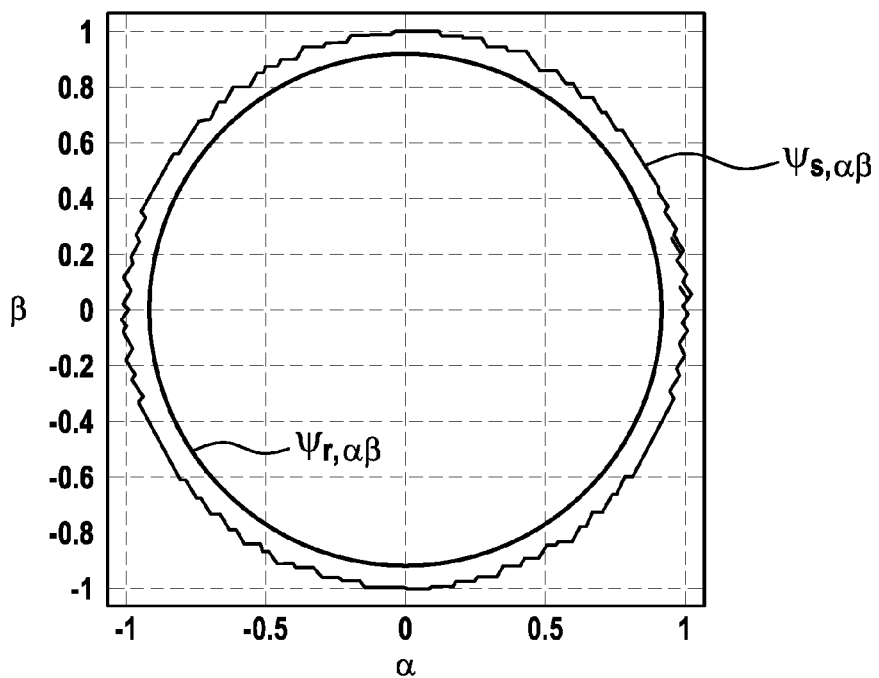
Figure 12D:
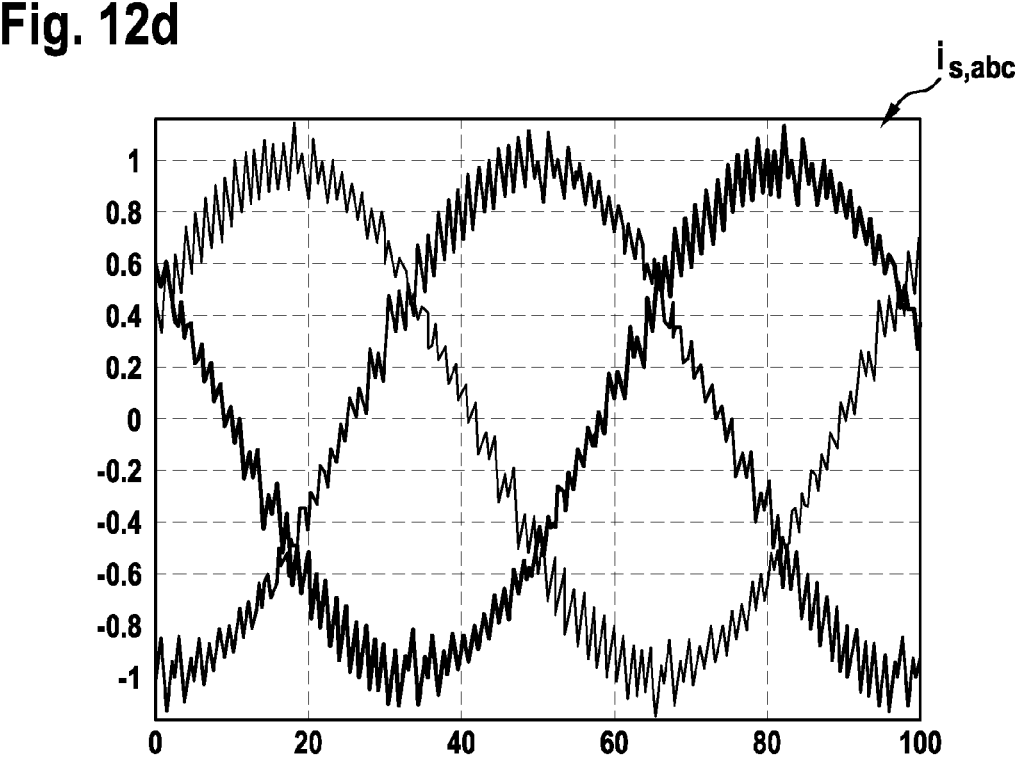

The resulting three-phase switch positions are shown in FIG. 12b. FIG. 12c shows the (piecewise affine) trajectory of the stator flux vector in the stationary orthogonal αβ-coordinate system. The stator flux trajectory is almost circular at this high pulse number. The rotor flux trajectory is the inner circular trajectory. The three-phase stator currents of the machine are shown in FIG. 12d. The total demand distortion of the current is 7.5%.

Figure 13A:
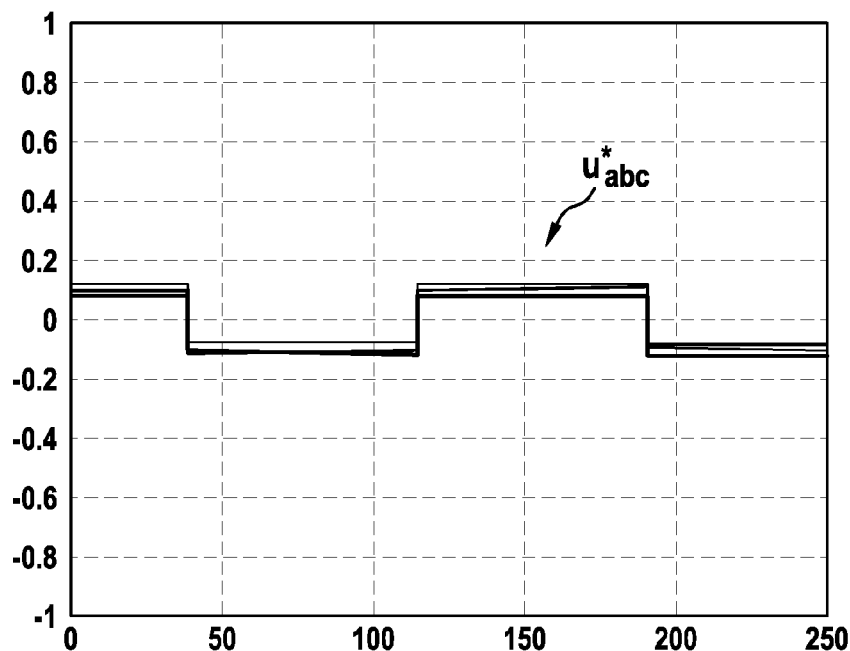
FIGS. 13a to 13d show diagrams with modulating signals, voltages, fluxes and currents produced by the method of FIG. 2 during low-speed operation.
Figure 13B:
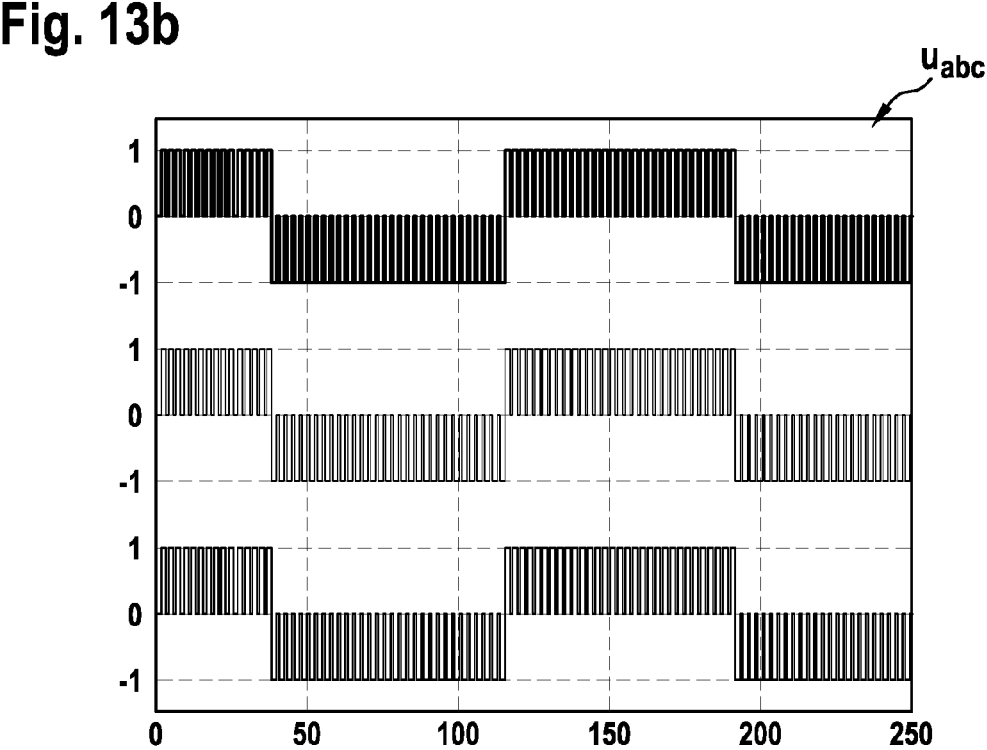
Figure 13C:
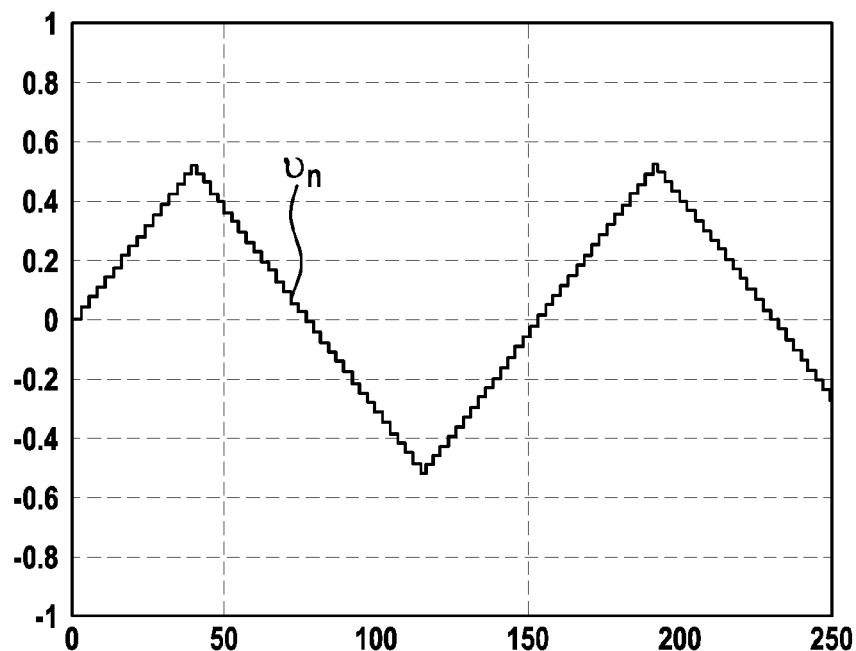
Figure 13D:
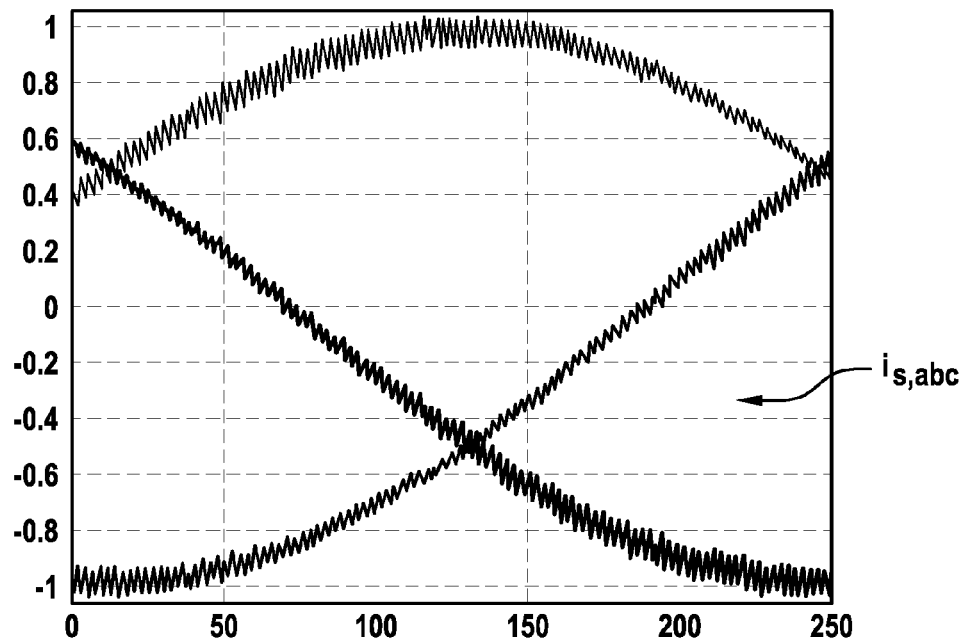

FIGS. 13a to 13d show quantities of a converter system 10 during low-speed operation and under the control of the controller 24 as described above. The system 10 is operated at 2% speed, i.e. at $f_1=1$ Hz, and rated torque. A quarter of the fundamental period is shown. The carrier frequency is kept at $f_c=400$ Hz, resulting in the high pulse number d=200. A large common-mode offset of $\pm \hat{u}_0$ is added to the modulating signal. Specifically, $\hat{u}_0=0.1$ is chosen, which allows one to use the hysteresis controller (18) to control the neutral point potential $v_n$. The large common-mode offset $\pm \hat{u}_0$ shifts the three-phase switching pattern completely into the upper or the lower half, see FIG. 13b. Whenever the neutral point potential $v_n$ hits its bounds at $v_{n,min}=-0.025$ and $v_{n,max}=0.025$, the hysteresis controller (18) flips the sign of the common-mode component. This happens at the time instants t=37.5 ms, 113.75 ms and 190 ms. Despite the significant common-mode component, the stator currents are almost sinusoidal, as can be seen in FIG. 13d.

Figure 14A:
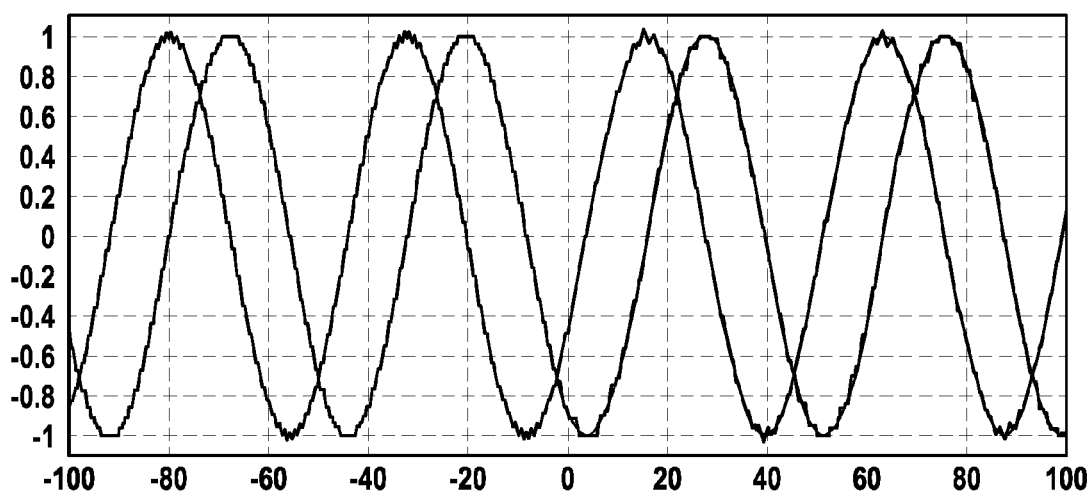
FIGS. 14a and 14b show a flux reference and generated switching patterns during a change from optimized pulse patterns to carrier-based pulse width modulated pulse patterns as performed by the method of FIG. 2.
Figure 14B:
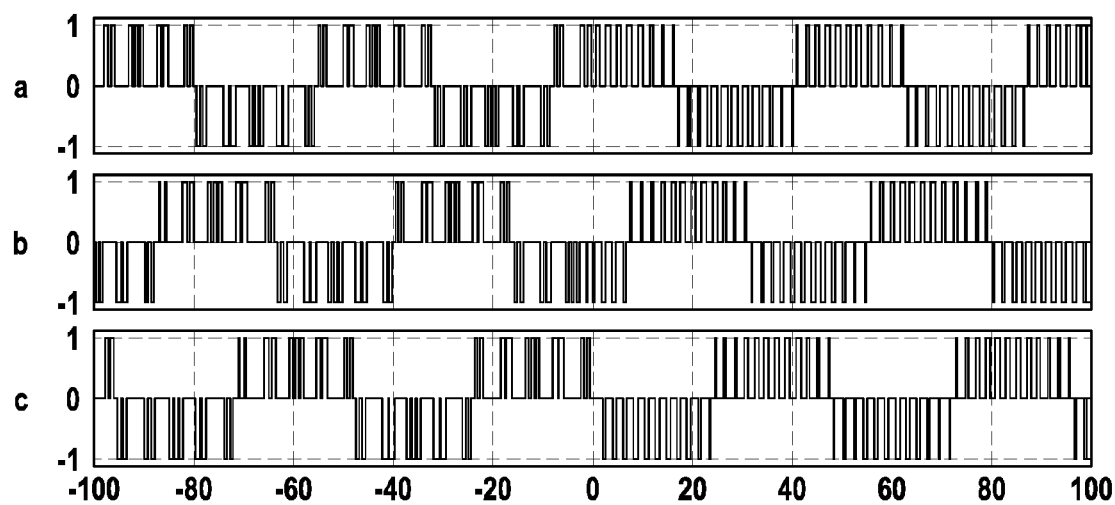

FIGS. 14a and 14b show a switch from optimized pulse patterns to carrier-based pulse width modulated pulse patterns at time t=0. Before time t=0, an optimized pulse pattern with pulse number d=11 is used, whereas after time t=0, the switching patterns are generated online with the carrier to fundamental frequency ratio $f_c/f_1=22$.

FIG. 14a shows that the change in switching pattern generation does not cause any transient or disturbance. At time t=0, the shape of the flux reference changes from piecewise affine (for optimized pulse patterns) to sinusoidal. The stator flux ripple increases when using the online generated switching patterns, since these switching patterns and their flux trajectory are suboptimal. The corresponding three-phase switch positions are depicted in FIG. 14b. The shift from optimized pulse patterns to pulse width modulated switching patterns with a fixed modulation cycle at time t=0 is clearly visible.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A method for controlling an electrical converter, the electrical converter being adapted for converting a DC voltage into a multi-phase voltage with at least two voltage levels, the method comprising:

determining a modulating signal vector from a stator flux reference vector;

determining a switching pattern from the modulating signal vector via pulse width modulation, the switching pattern comprising a sequence of switching transitions, wherein a switching transitions defines a switch position, at which a phase of the converter is switched from one voltage level to another voltage level, and a transition time instant at which the phase of the converter is switched, wherein the switching pattern is regularly determined at each sampling time instant over a prediction horizon;

determining a stator flux error by subtracting the stator flux reference vector from an estimated stator flux vector, which is estimated from measurements in the electrical converter;

modifying the switching pattern by moving transition time instants of switching transitions of the switching pattern, such that the stator flux error is minimized; and applying a part of the modified switching pattern to the electrical converter.

2. The method of claim 1,
wherein a stator flux correction is defined by a sum of products of a voltage level difference and a time difference, the voltage level difference of a switching transition being the difference of the voltage level before and after the switching transition and the time difference being the difference between a moved and an unmodified transition time instant;
wherein the stator flux correction is optimized by moving the transition time instants, such that the stator flux correction is equal to the stator flux error.

3. The method of claim 1,
wherein only the part of the modified switching pattern equal to a difference between consecutive sampling time instants is applied to the electrical converter.

4. The method of claim 1,
wherein the switching transitions of the switching pattern are determined over a prediction horizon by:
determining future samples of the modulating signal vector over the prediction horizon by rotating the modulating signal vector in an αβ0-coordinate system with an actual angular frequency to a time instant of the respective future sample; and
generating a switching transition when a carrier signals crosses a value of the future sample during a time interval of the future sample.

5. The method of claim 1, wherein the stator flux reference vector is a three-component vector in an αβ0-coordinate system and a 0-component of the stator flux reference vector is used for control of a neutral point potential.

6. The method of claim 1, wherein a common-mode component is added to the modulating signal vector.

7. The method of claim 6,
wherein, when a modulation index determined from a magnitude of the stator flux reference vector, is smaller than a threshold, the common-mode component is at least the modulation index plus a minimal pulse width divided by a carrier interval length of a carrier signal, such that pulse lengths of pulses generated by pulse width modulation with the carrier signal are longer than the minimal pulse width.

8. The method of claim 6,
wherein the common-mode component is controlled with a hysteresis controller, which sets the common-mode component to a first value, when a neutral point potential is larger than a maximal value and which sets the common-mode component to a second value of opposite sign with respect to the first value, when the common-mode component is smaller than a minimal value.

9. The method of claim 1, wherein the stator flux reference vector is determined from a reference angle and a reference magnitude.

10. The method of claim 1, wherein a pulse number for the switching pattern is determined from a fundamental frequency and a maximal allowed switching frequency; and/or wherein, when a pulse number exceeds a threshold, the switching pattern is determined with pulse width modulation and otherwise, the switching pattern is determined from a table of optimized pulse patterns.

11. The method of claim 10,
wherein in the case when an optimized pulse pattern is used for determining a switching pattern, the stator flux reference vector is determined from the optimized pulse pattern.

12. A computer program on a computer readable medium, which when executed on a processor, is adapted for controlling an electrical converter, the electrical converter adapted for converting a DC voltage into a multi-phase voltage with at least two voltage levels, comprising:
determine a modulating signal vector from a stator flux reference vector;
determine a switching pattern from the modulating signal vector via pulse width modulation, the switching pattern comprising a sequence of switching transitions, wherein a switching transitions defines a switch position, at which a phase of the converter is switched from one voltage level to another voltage level, and a transition time instant at which the phase of the converter is switched; wherein the switching pattern is regularly determined at each sampling time instant over a prediction horizon;
determine a stator flux error by subtracting the stator flux reference vector from an estimated stator flux vector, which is estimated from measurements in the electrical converter;
modify the switching pattern by moving transition time instants of switching transitions of the switching pattern, such that the stator flux error is minimized; and
apply a part of the modified switching pattern to the electrical converter.

13. The method of claim 2, wherein only the part of the modified switching pattern equal to a difference between consecutive sampling time instants is applied to the electrical converter.

14. The method of claim 13,
wherein the switching transitions of the switching pattern are determined over a prediction horizon by:
determining future samples of the modulating signal vector over the prediction horizon by rotating the modulating signal vector in an αβ0-coordinate system with an actual angular frequency to a time instant of the respective future sample; and
generating a switching transition when a carrier signals crosses a value of the future sample during a time interval of the future sample.

15. The method of claim 14, wherein the stator flux reference vector is a three-component vector in the αβ0-coordinate system and a 0-component of the stator flux reference vector is used for control of a neutral point potential.

16. The method of claim 15, wherein a common-mode component is added to the modulating signal vector.

17. The method of claim 16, wherein, when a modulation index determined from a magnitude of the stator flux reference vector, is smaller than a threshold, the common-mode component is at least the modulation index plus a minimal pulse width divided by a carrier interval length of a carrier signal, such that pulse lengths of pulses generated by pulse width modulation with the carrier signal are longer than the minimal pulse width.

18. The method of claim 16, wherein the common-mode component is controlled with a hysteresis controller, which sets the common-mode component to a first value, when a neutral point potential is larger than a maximal value and which sets the common-mode component to a second value of opposite sign with respect to the first value, when the common-mode component is smaller than a minimal value.

19. A controller for controlling an electrical converter, the controller comprising:
a processor and a computer readable medium,
wherein the electrical converter is adapted for converting a DC voltage into a multi-phase voltage with at least two voltage levels,
wherein the processor is configured to:
determine a modulating signal vector from a stator flux reference vector;
determine a switching pattern from the modulating signal vector via pulse width modulation, the switching pattern comprising a sequence of switching transitions, wherein a switching transitions defines a switch position, at which a phase of the converter is switched from one voltage level to another voltage level, and a transition time instant at which the phase of the converter is switched; wherein the switching pattern is regularly determined at each sampling time instant over a prediction horizon,
determine a stator flux error by subtracting the stator flux reference vector from an estimated stator flux vector, which is estimated from measurements in the electrical converter;
modify the switching pattern by moving transition time instants of switching transitions of the switching pattern, such that the stator flux error is minimized; and
apply a part of the modified switching pattern to the electrical converter.

20. An electrical converter, comprising:
a converter circuit adapted for converting a DC voltage into a multi-phase voltage with at least two voltage levels; and
a controller according to claim 19 adapted for controlling semiconductor switches of the converter circuit.

* * * * *